United States Patent
Li et al.

(10) Patent No.: US 10,643,386 B2
(45) Date of Patent: May 5, 2020

(54) PRESENTING IMAGE TRANSITION SEQUENCES BETWEEN VIEWING LOCATIONS

(71) Applicant: Zillow Group, Inc., Seattle, WA (US)

(72) Inventors: Yuguang Li, Seattle, WA (US); Li Guan, Bellevue, WA (US)

(73) Assignee: Zillow Group, Inc., Seattle, WA (US)

( * ) Notice: Subject to any disclaimer, the term of this patent is extended or adjusted under 35 U.S.C. 154(b) by 43 days.

(21) Appl. No.: 15/950,881

(22) Filed: Apr. 11, 2018

(65) Prior Publication Data

US 2019/0318538 A1    Oct. 17, 2019

(51) Int. Cl.
*G06T 15/00* (2011.01)
*G06T 19/00* (2011.01)
*G06T 19/20* (2011.01)

(52) U.S. Cl.
CPC .......... *G06T 19/003* (2013.01); *G06T 19/20* (2013.01); *G06T 2207/10028* (2013.01); *G06T 2219/028* (2013.01)

(58) Field of Classification Search
CPC ......... G06T 15/04; G06T 15/20; G06T 17/10; G06T 15/06; G06T 19/20; G06T 3/0031; G06T 2215/16; G06T 2210/04
USPC ......................................................... 345/418
See application file for complete search history.

(56) References Cited

U.S. PATENT DOCUMENTS

| 5,140,352 A | 8/1992 | Moore et al. |
| 6,031,540 A | 2/2000 | Golin et al. |
| 6,141,034 A | 10/2000 | McCutchen |
| 6,317,166 B1 | 11/2001 | McCutchen |

(Continued)

FOREIGN PATENT DOCUMENTS

| EP | 2413097 A2 | 2/2012 |
| EP | 2505961 A2 | 10/2012 |

(Continued)

OTHER PUBLICATIONS

3D Interactive Virtual Tour, How to navigate a 3D Interactive Virtual Tour, Aug. 15, 2016, 0:00-2:37; https://www.youtube.com/watch?v=anLQKafj2GE.*

(Continued)

*Primary Examiner* — Phu K Nguyen
(74) *Attorney, Agent, or Firm* — VLP Law Group LLP; James A. D. White

(57) ABSTRACT

Techniques are described for, given two images taken at two viewing locations, generating and presenting an image transition sequence that simulates viewer movement between the viewing locations, such as without using information about relative distance between the viewing locations and other depth information to objects in an environment around the viewing locations. The start and end images for an image transition sequence may be part of panorama images acquired at the viewing locations, and generating of the image transition sequence may include selecting and using one of multiple types of transition sequences to perform rotating (e.g., from a start image's viewing direction to face toward the viewing location for the end image), zooming (e.g., to simulate moving forward), and/or blending of the end image with a modified version of the start image, with the resulting image transition sequence played as a video or other animation.

23 Claims, 13 Drawing Sheets

(56) References Cited

U.S. PATENT DOCUMENTS

| | | |
|---|---|---|
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 6,778,207 B1 | 8/2004 | Lee et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,317,962 B2 * | 4/2016 | Morato .................. G06T 15/04 |
| 9,324,190 B2 | 4/2016 | Bell et al. |
| 9,360,671 B1 | 6/2016 | Zhou |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Mamo et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Bidder et al. |
| 9,836,885 B1 * | 12/2017 | Eraker .................. G06T 19/003 |
| 9,852,351 B2 | 12/2017 | Aguilera Perez et al. |
| 9,933,264 B2 * | 4/2018 | Monterroza ............. G06N 3/08 |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,068,373 B2 * | 9/2018 | Lee ....................... G06F 3/0488 |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 * | 3/2019 | Eraker .................. G06T 19/003 |
| 10,281,293 B2 * | 5/2019 | Musabji ............. G01C 21/3638 |
| 10,339,716 B1 | 7/2019 | Powers et al. |
| 10,366,531 B2 | 7/2019 | Sheffield |
| 10,395,435 B2 | 8/2019 | Powers et al. |
| 2002/0105531 A1 | 8/2002 | Niemi |
| 2006/0132482 A1 | 6/2006 | Oh |
| 2006/0256109 A1 | 11/2006 | Acker et al. |
| 2010/0171759 A1 | 7/2010 | Nickolov et al. |
| 2010/0232709 A1 | 9/2010 | Zhang et al. |
| 2011/0234832 A1 | 9/2011 | Ezoe et al. |
| 2012/0075414 A1 | 3/2012 | Park et al. |
| 2012/0293613 A1 | 11/2012 | Powers et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0025536 A1 | 1/2018 | Bell et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |

(56) References Cited

U.S. PATENT DOCUMENTS

| | | |
|---|---|---|
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hoyden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016/154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

Interactive Entertainment Studios, VRPV—Virtual Reality Property Viewer, Jul. 19, 2014, 0:00-10:28; https://www.youtube.com/watch?v=XmznvxPw7A8.*

Zhang, Mobile Indoor Scanner with VR Navigation, Oct. 25, 2016, 0:00-2:33;https://www.youtube.com/watch?v=s_KjThrziTc.*

TruVision, Modern Bungalow—Virtual Reality for Architecture, Oct. 29, 2015, https://www.youtube.com/watch?v=E1Y4CsID-F8.*

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide 3D Virtual Tours, retrieved on Mar. 26, 2019, from https://goiguide.com, 6 pages.

Immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in the New York Times, Feb. 13, 2019, retrieved Mar. 28, 2019, 6 pages.

Wikipedia Dissolve (filmmaking), retrieved on Feb. 21, 2018, from https://en.wikipedia.org/wiki/Dissolve_(filmmaking), 2 pages.

Wikipedia Blend modes, retrieved on Feb. 21, 2018, from https://en.wikipedia.org/wiki/Blend_modes, 8 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Wikipedia, Dissove (filmmaking), retrieved on Feb. 21, 2018, from https://en.wikipedia.org/wiki/Dissolve_(filmmaking), 2 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

* cited by examiner

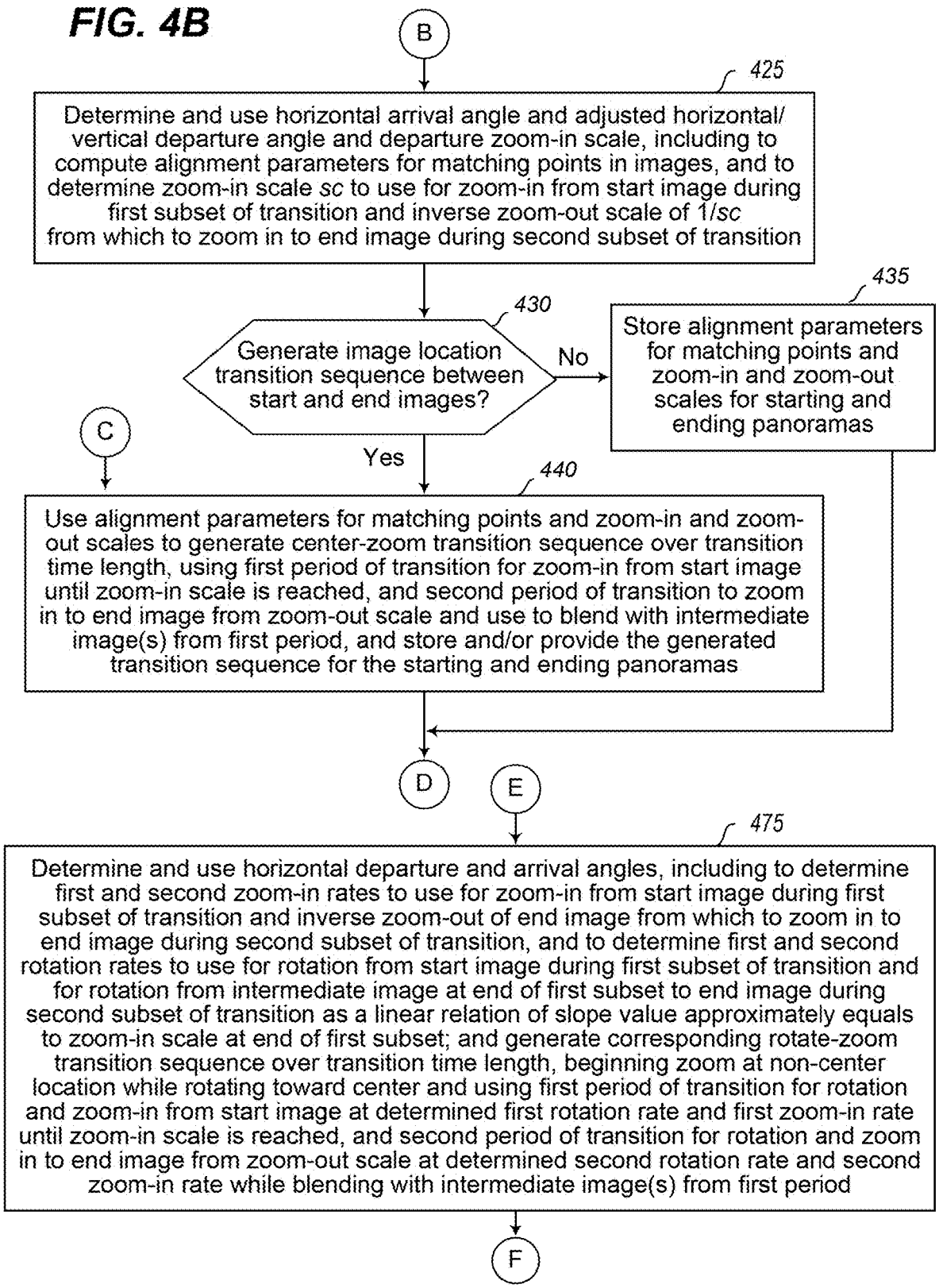

PRESENTING IMAGE TRANSITION SEQUENCES BETWEEN VIEWING LOCATIONS

TECHNICAL FIELD

The following disclosure relates generally to techniques for providing image transition sequences between viewing locations, such as to generate and present an image transition sequence between inter-connected panorama images at starting and ending viewing locations based in part on starting and ending view directions at the starting and ending viewing locations.

BACKGROUND

In various fields and circumstances, such as real estate acquisition and development, property inspection, architectural analysis, general contracting, improvement cost estimation and other circumstances, it may be desirable to view the interior of a house, office, or other building without having to physically travel to and enter the building. However, it can be difficult or impossible to effectively display visual information captured within building interiors to users at remote locations, such as to enable a user to fully understand the layout and other details of the interior, including to experience a visual sense of moving through the interior in a user-selected manner.

BRIEF DESCRIPTION OF THE DRAWINGS

FIGS. 4A-4B illustrate an example embodiment of a flow diagram for an Image Locations Transition Manager (ILTM) system routine in accordance with an embodiment of the present disclosure.

DETAILED DESCRIPTION

Figure 1A:
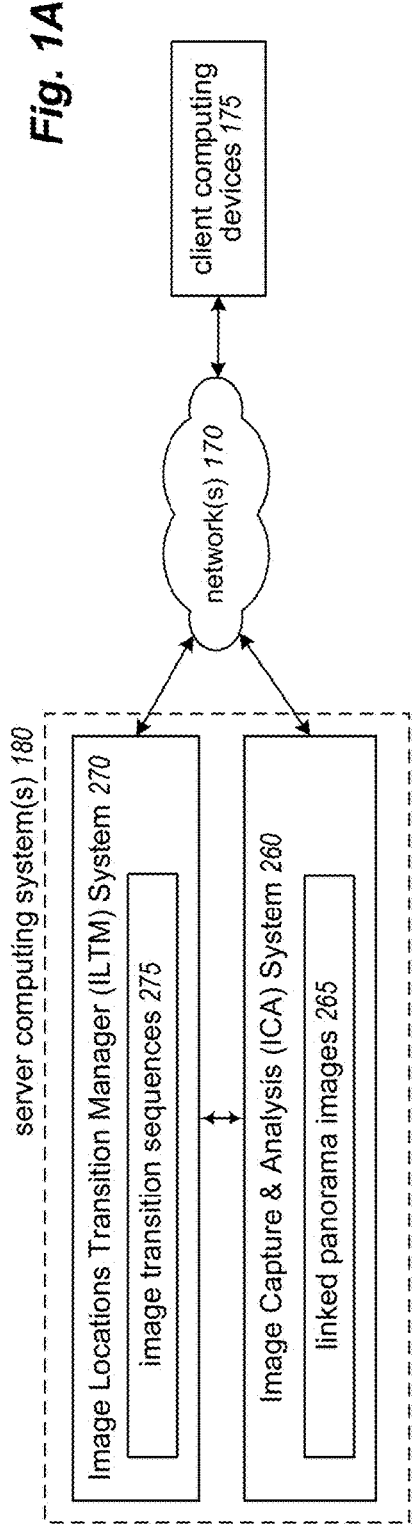
FIGS. 1A-1B are diagrams depicting an exemplary building interior environment and computing system(s) for use in embodiments of the present disclosure.

The present disclosure relates generally to techniques for using computing devices to perform automated operations related to, with respect to two images taken at viewing locations near each other, generating and presenting an image transition sequence that simulates continuous or repeated viewer movement for travelling between the viewing locations—in at least some such embodiments, the generating and presenting are performed without having detailed information about relative distance between the viewing locations and other depth information to objects in an environment around the viewing locations. In addition, one or both of the start and end images for an image transition sequence may be part of panorama images acquired at one of the viewing locations in at least some such embodiments, such as to generate and present an image transition sequence that simulates traveling between two inter-connected panorama image viewing locations—it will be appreciated that such a panorama image may in some situations be represented in a spherical coordinate system and cover up to 360° around horizontal and/or vertical axes, such that a user viewing a starting panorama image may move the viewing direction within the starting panorama image to different orientations to cause different images to be rendered within the starting panorama image (including, if the panorama image is represented in a spherical coordinate system, to convert the image being rendered into a planar coordinate system), which results in the start image for a image transition sequence potentially having or not having a viewing direction toward the end image's destination viewing location. Accordingly, in at least some embodiments and situations, an image transition sequence may include rotating (e.g., from a start image's viewing direction to face toward the viewing location for the end image), zooming (e.g., to simulate moving forward from a starting viewing location of the start image toward the destination viewing location of the end image), and blending of the end image with one or more other images based on the start image that are used in the image transition sequence, with the transition sequence played as a video or other animation (e.g., using Web Graphics Library, or WebGL). Some or all of the techniques described herein may be performed via automated operations of an embodiment of an Image Location Transition Manager ("ILTM") system, as discussed in greater detail below.

In at least some embodiments, different types of image transition sequences may be generated and used in different situations based on one or more factors, such as a degree of similarity of the outgoing viewing direction from the start image to a straight-line direction between the viewing locations of the start and end images. For example, if the outgoing viewing direction from the start image is less than a defined center-zoom transition threshold relative to the straight-line direction between the viewing locations of the start and end images (e.g., is within 5° of the straight-line direction, is sufficiently small so that the end image is wholly included within the start image, etc.), the ILTM system may use a precision zooming technique (referred to at times herein as a "center-zoom transition") in which rotation is initially used to reduce the difference between the outgoing viewing direction and straight-line direction (referred to at times herein as the "departure adjusting angle"), optionally to zero, and then begin zooming in the start image at its center of the start image for a first period of time until a zoom scale sc is reached, after which a zoomed-out version of the end image beginning at a zoom scale of 1/sc is blended with the zoomed-in start image and is further zoomed until the end image is reached, with the zoomed-in start image overlayed precisely with the zoomed-out end image during the blending regardless of parallax. Some or all of the center-zoom transition may, in at least some embodiments, be pre-computed between starting and ending panorama images and their associated viewing locations, such as to provide for immediate presentation when requested by a user. Additional details related to the use of the center-zoom transition techniques are included below.

Figure 2A:
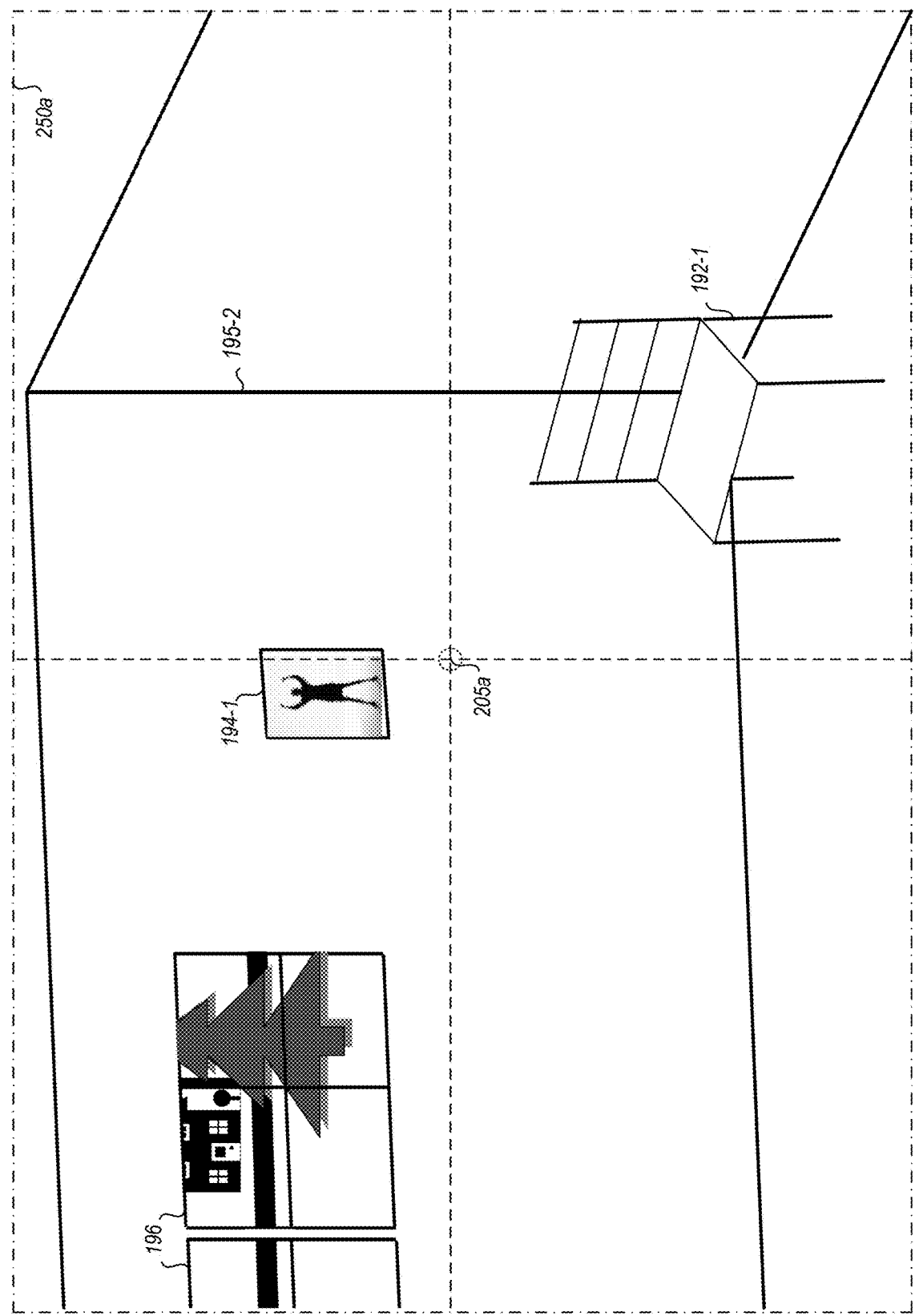
FIGS. 2A-2I illustrate examples of generating and presenting image transition sequences between inter-connected panorama images or other starting and ending images at different viewing locations.
Figure 2B:
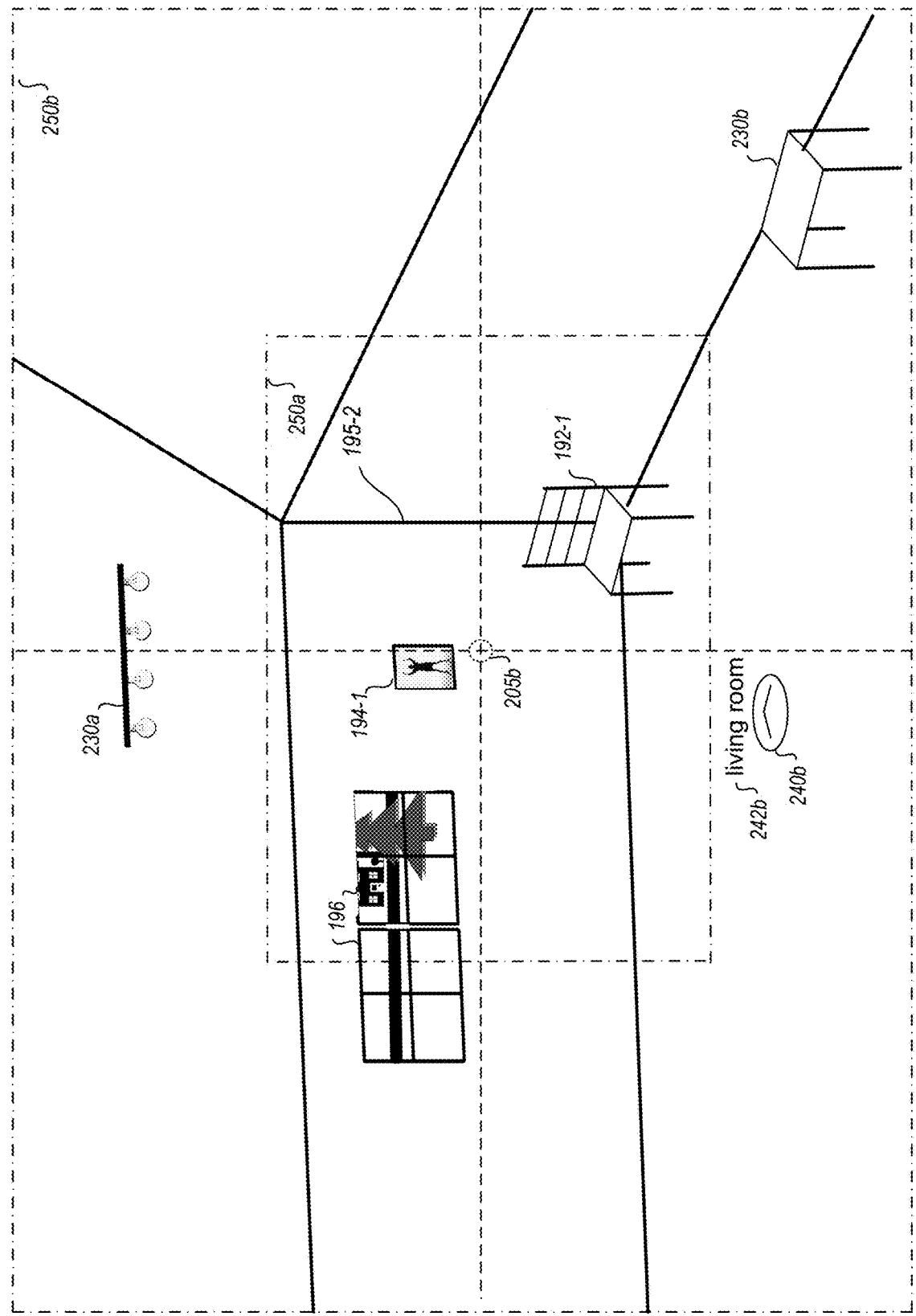
Figure 2C:
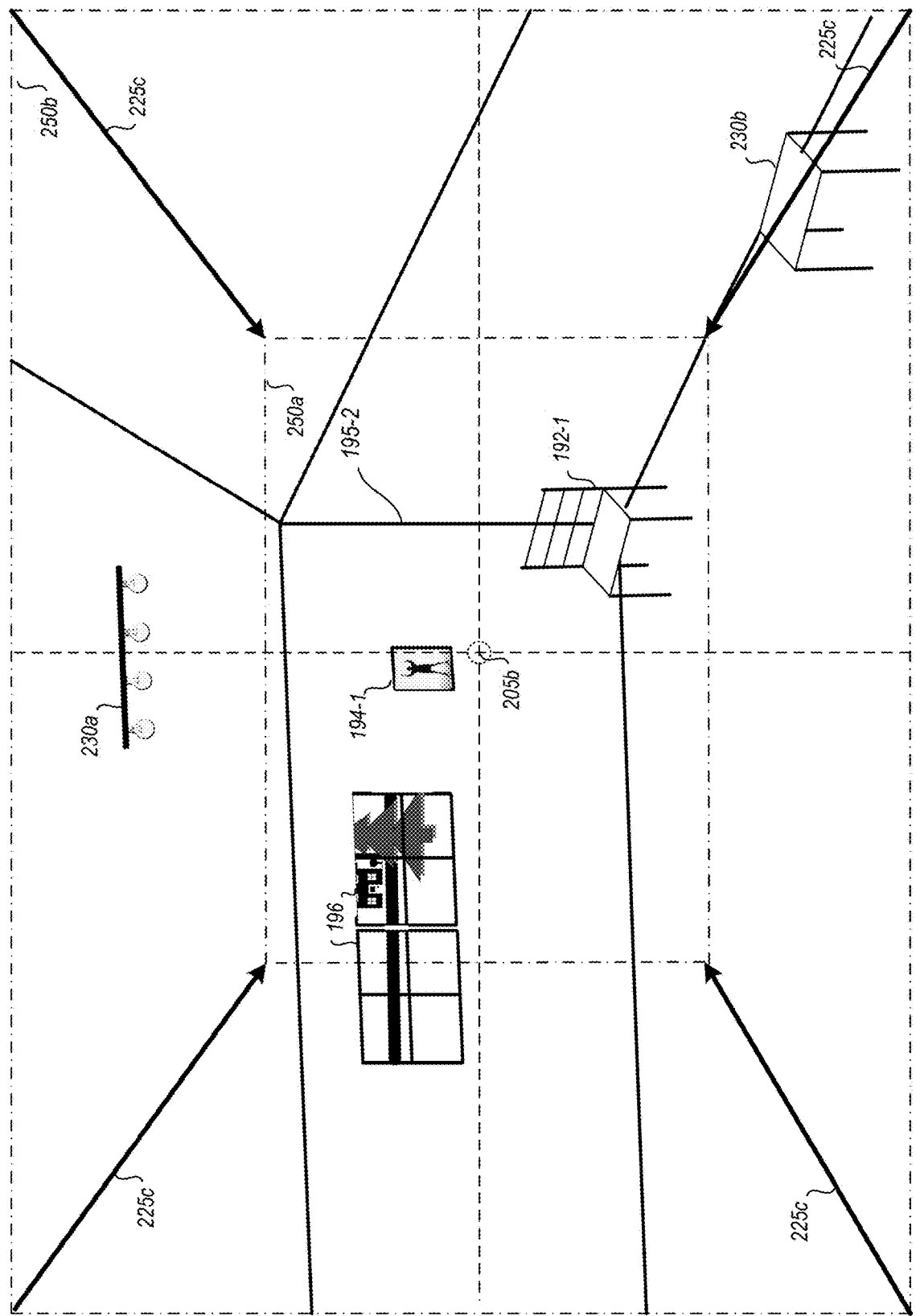
Figure 2D:
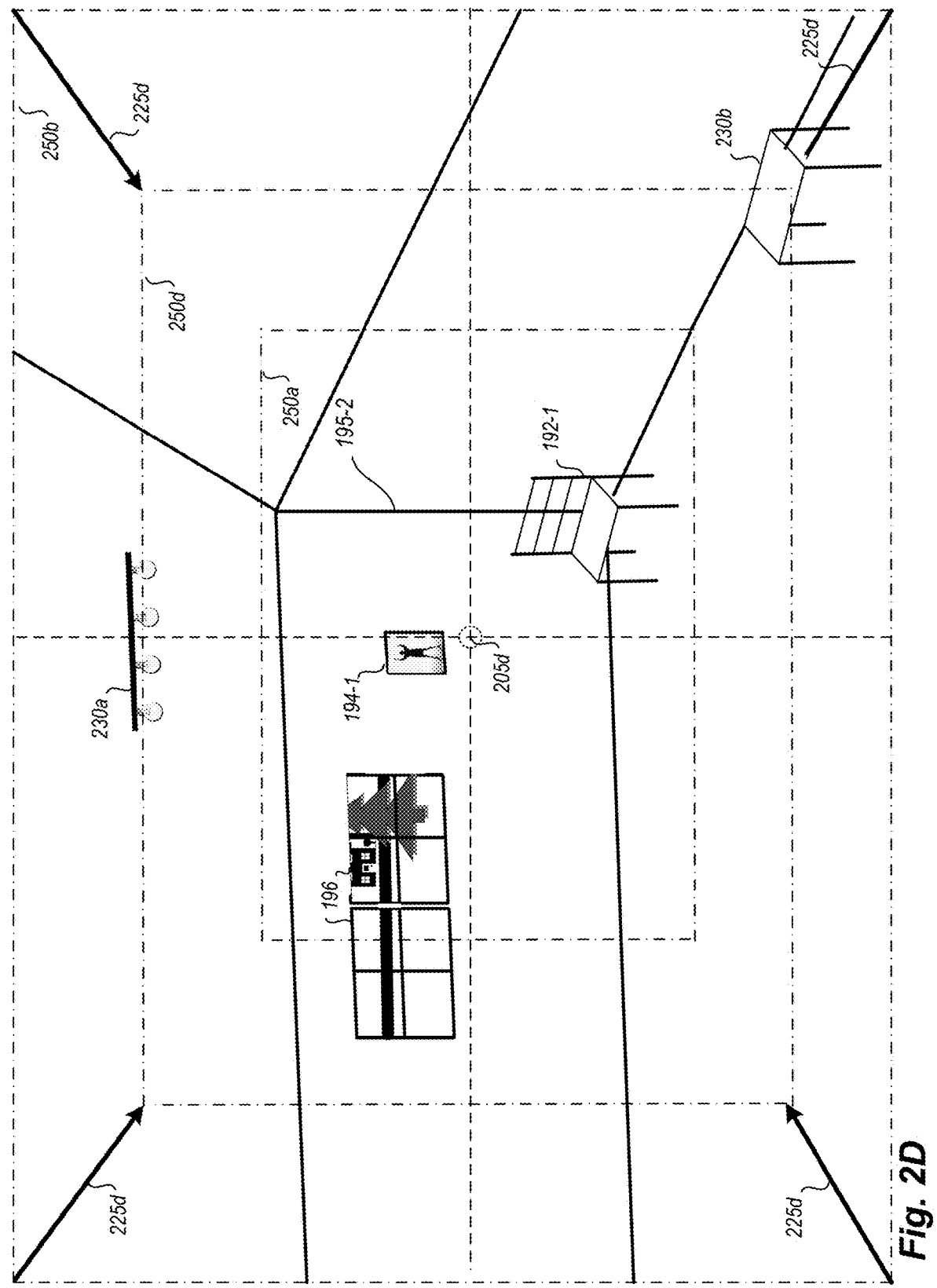
Figure 2E:
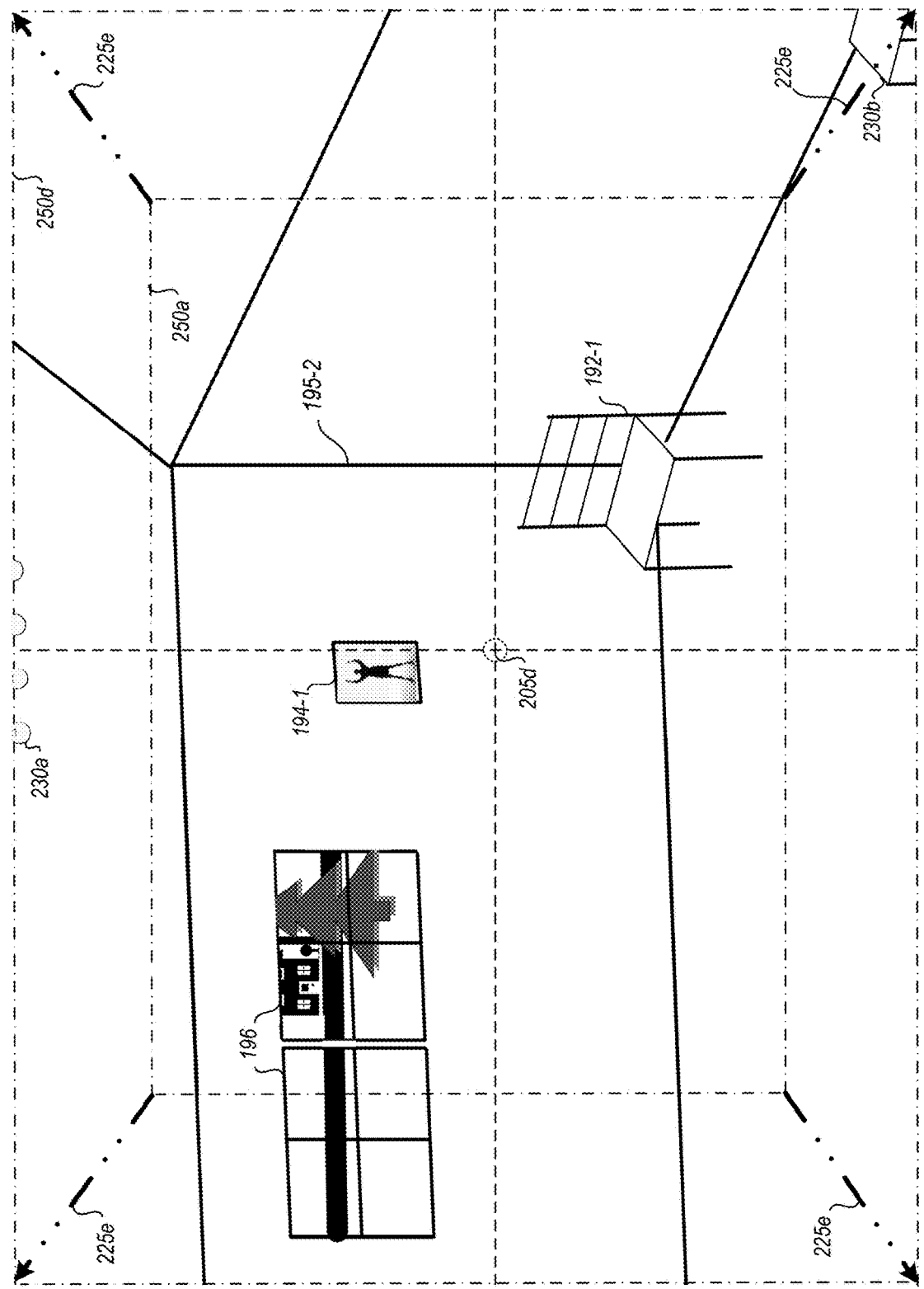
Figure 2F:
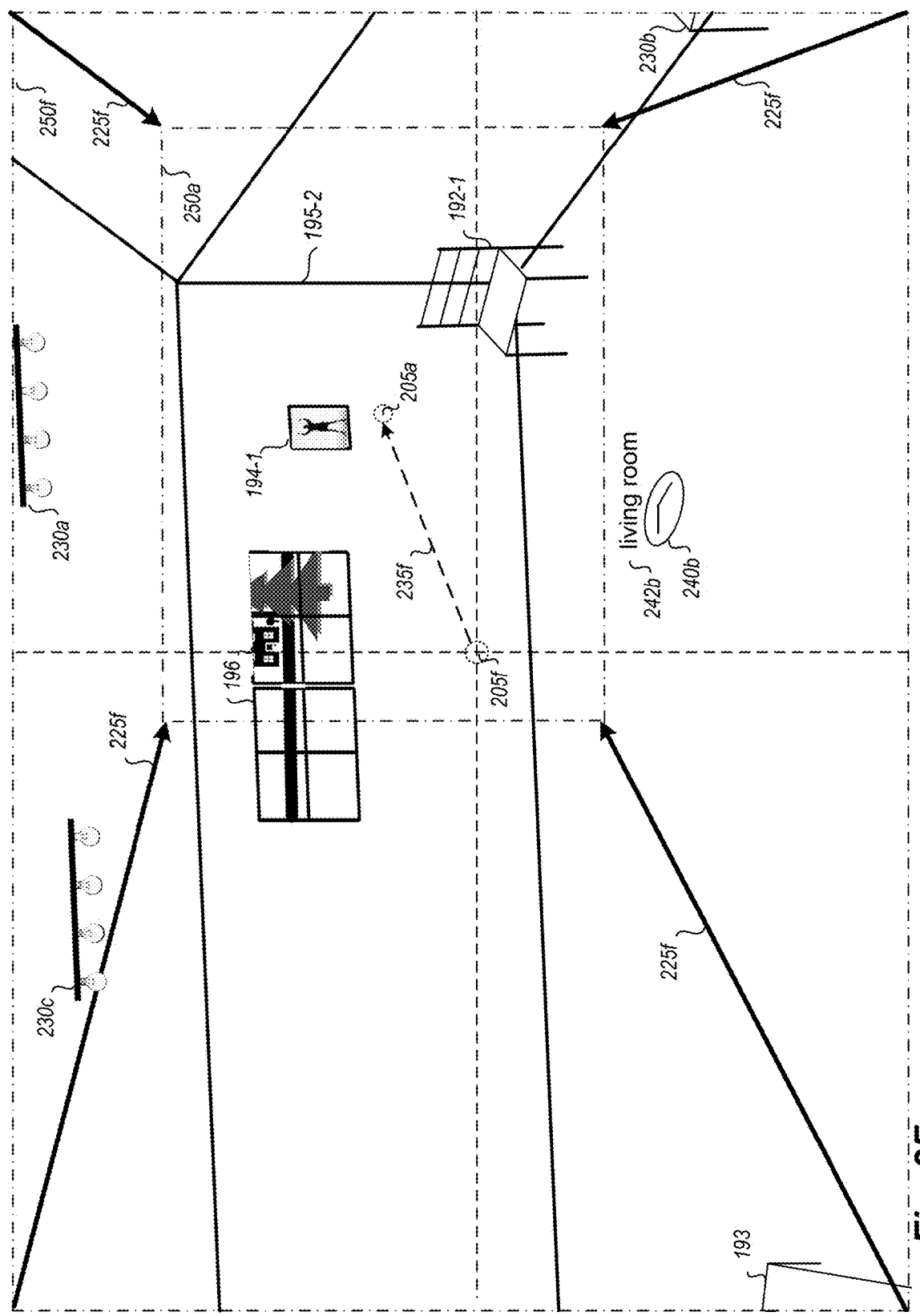
Figure 2G:
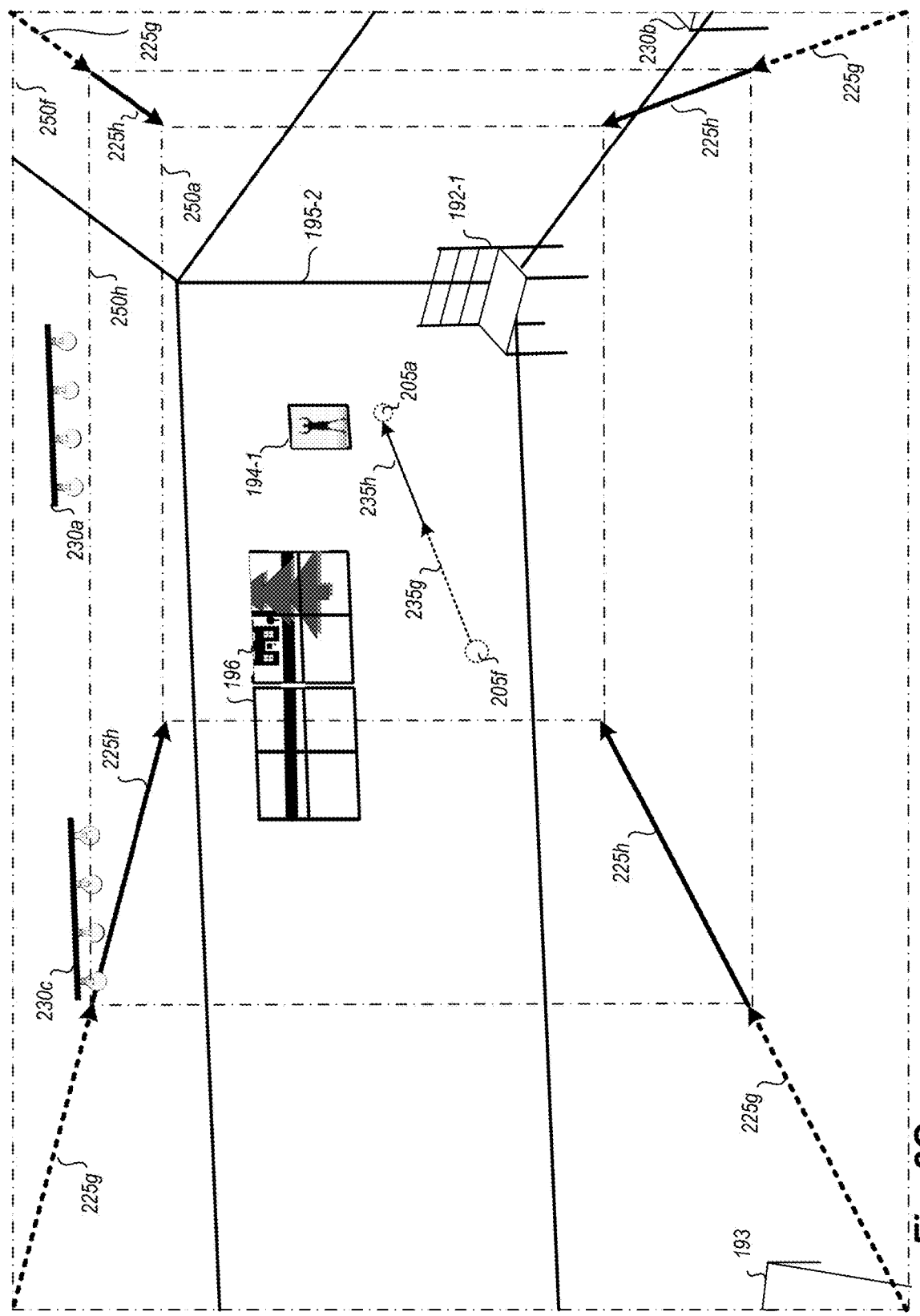
Figure 2H:
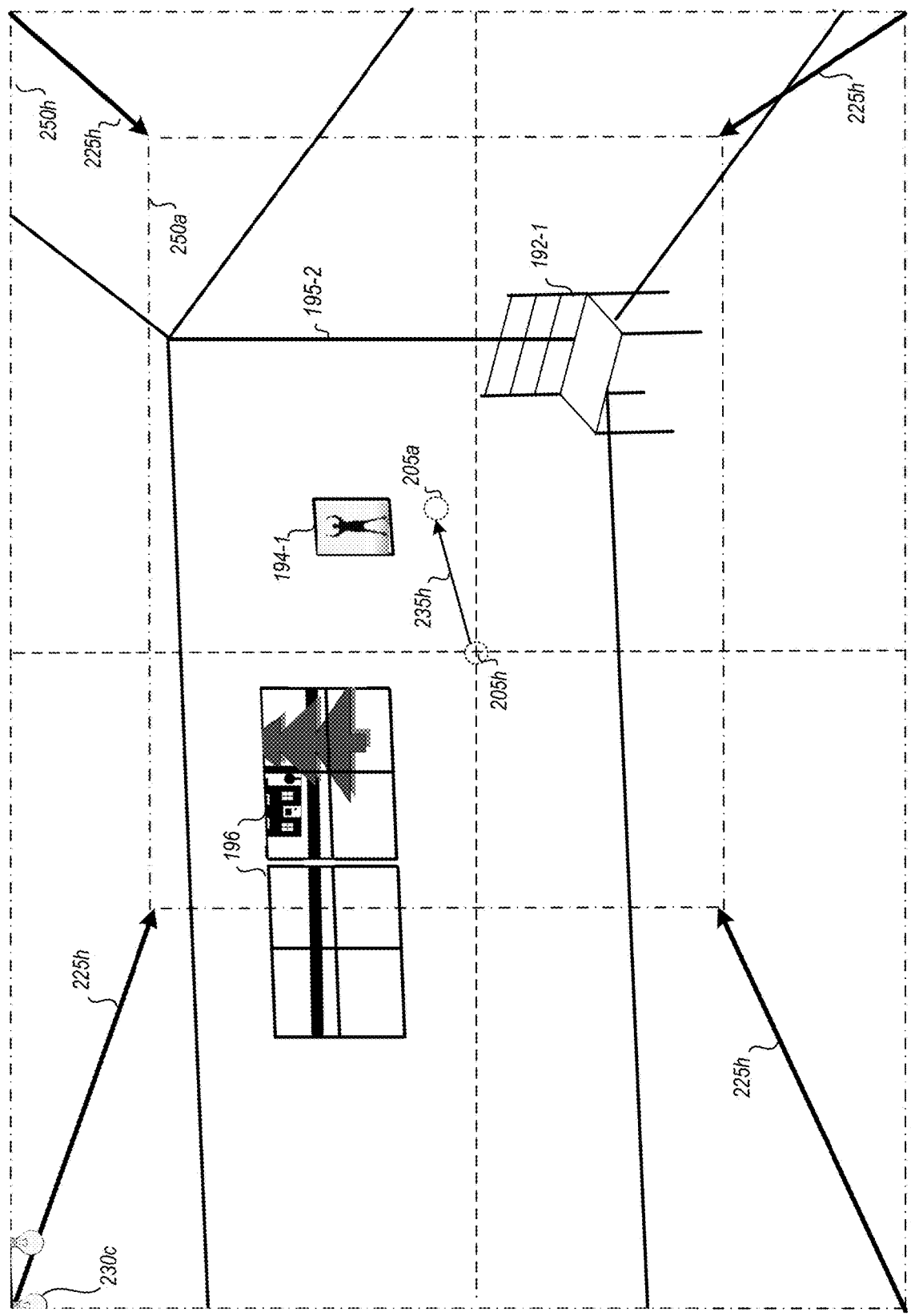
Figure 2I:
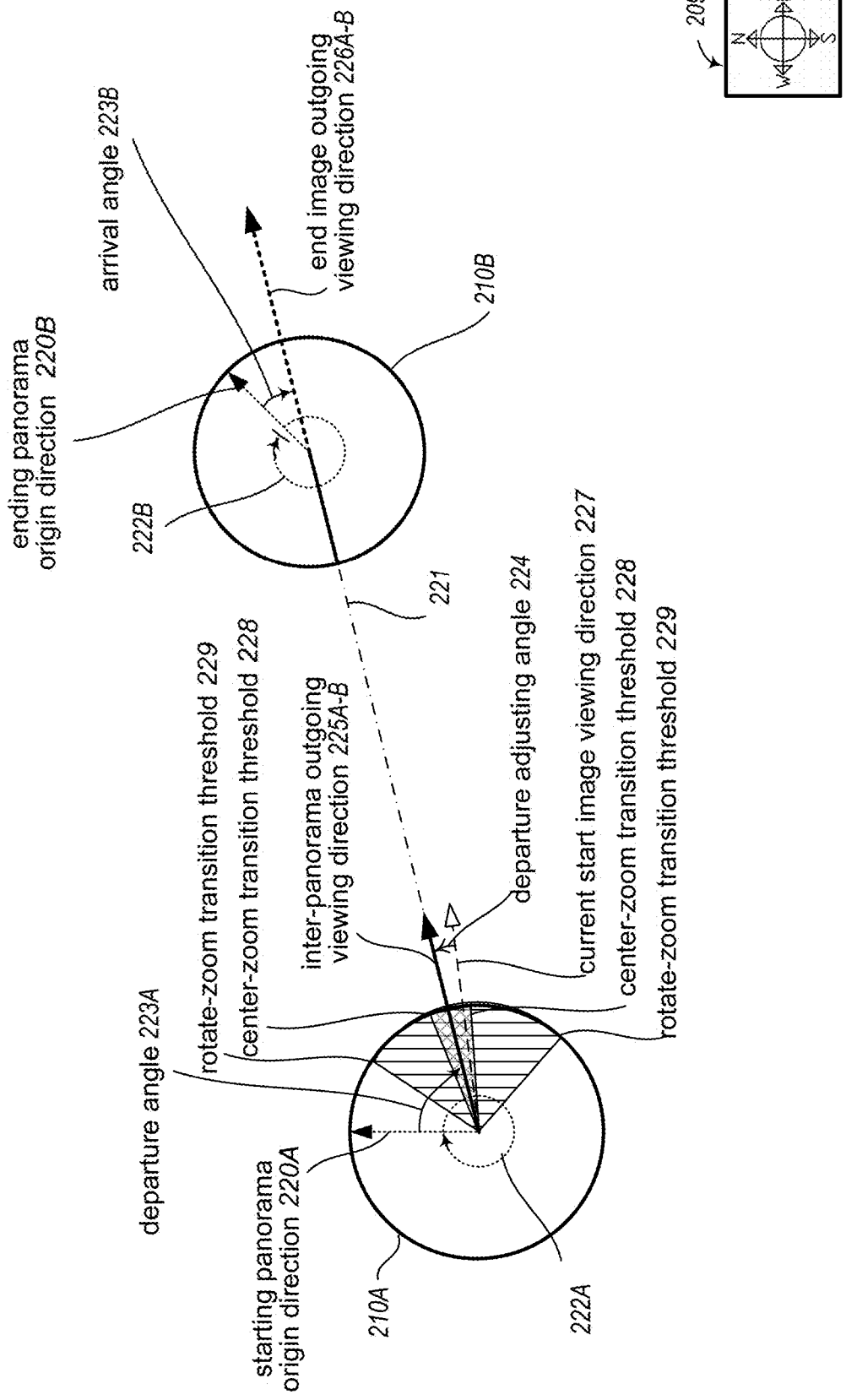

As a visual example of the use of such a center-zoom transition, consider the example of FIG. 2I, in which two example panorama images are acquired at two viewing locations 210A and 210B in a surrounding building or other environment (not shown). For purposes of this example, the panorama images are discussed only with respect to a horizontal plane, but it will be appreciated that similar information may be acquired and used in vertical directions as well. In this example, and with respect to the panorama image acquired at viewing location 210A (referred to as the "starting panorama image" in this example), the acquisition of the panorama image may begin at viewing direction 220A (corresponding to facing the north in this example, as shown by legend or key directional indicator 209) and, as shown by information 222A, proceed in a clockwise manner corresponding to a 360° full rotational turn around a vertical axis (e.g., resulting in 150 frames/images being acquired from the viewing location 210A, such as 6 frames per second if the full 360° rotation takes 25 seconds, although other amounts of rotation time and/or frames per second may be used in other situations, such as faster or slower rotation times and/or more or less frames per second). Similarly, with respect to the panorama image acquired at viewing location 210B (referred to as the "ending panorama image" in this example), the acquisition of the panorama image may begin at viewing direction 220B (corresponding to facing approximately northeast in this example) and, as shown by information 222B, proceed in a clockwise manner corresponding to an almost full 355° rotational turn around a vertical axis (e.g., resulting in 148 frames/images being acquired from the viewing location 210B in this example). An outgoing viewing direction 225A-B from the starting panorama image toward the ending panorama image is further shown along with a linking straight line 221 between the centers of the viewing locations (or a single point representing each viewing location), with information 223A indicating the rotation from starting direction 220A to outgoing viewing direction 225A-B (e.g., 84°, such that it is centered at frame 35 of the 150 frames for the starting panorama image, and optionally with 20 frames in each direction also including viewing location 210B, such that frames 10-60 of viewing location 210A's panorama image including viewing location 210B). Similarly, the ending panorama image has an ending viewing direction 226A-B for a transition from the starting panorama image that matches the same outgoing viewing direction 225A-B of the starting panorama image and corresponding linking straight line 221, with information 223B indicating the rotation from starting direction 220B to outgoing viewing direction 226A-B (e.g., 20°, such that the corresponding end image in the viewing direction 226A-B is centered at frame 8 of the 148 frames for the ending panorama image). In this situation, the end image from viewing location 210B is fully enclosed within the image from viewing location 210A at outgoing viewing direction 225A-B and in some additional frames/images in each direction from the outgoing viewing direction 225A-B, such as 5° (or 2 frames in each direction). Accordingly, if a user who is viewing the starting panorama image has a viewing direction that corresponds to one of frames 33 and 37 of the starting panorama image (which include all of the end image from the ending panorama image) when the user initiates an image transition sequence to the end image of the ending panorama image, such as the illustrated start image viewing direction 227 with a departing adjusting angle 224 of less than 5°, the ILTM system may use the precision center-zoom techniques noted above for the presentation of that image transition sequence. Corresponding center-zoom transition thresholds 228 are illustrated in FIG. 2I for reference purposes, although the thresholds 228 and departure adjusting angle 224 are increased in size relative to the discussion above for purposes of readability.

FIG. 2I further illustrates additional rotate-zoom transition thresholds 229 at larger distances from the outgoing viewing direction 225A-B than the center-zoom transition thresholds 228. For example, the rotate-zoom transition thresholds 229 may correspond to those frames of the starting panorama image that include the viewing location 210B but may not include all of the end image, such as to include 20 frames in each direction for this example (or 48° in each direction from the outgoing viewing direction 225A-B). In such situations that are outside of the center-zoom transition thresholds but within the rotate-zoom transition thresholds, a different type of image transition sequence may be generated and used in at least some embodiments. In particular, for such rotate-zoom transitions, the ILTM system may generate a transition sequence in which zooming begins at a non-center location while the image is being rotated toward the straight line viewing direction for the ending panorama (i.e., toward viewing direction 225A-B in the example of FIG. 2I) during a first period of time until a zoom scale sc is reached, after which a corresponding rotated and zoomed-out version of the end image beginning at a zoom scale of 1/sc is blended during a second period of time with the zoomed-in and rotated start image and is further zoomed and rotated until the end image is reached. The rotation and zoom speeds for the first and second periods may be selected so that the images overlap when the second period begins, such as to use rotation speeds in a linear relation of slope value approximately equals to zoom-in scale sc. Additional details related to the use of the rotate-zoom transition techniques are included below.

In further situations in which a current viewing direction from the starting panorama image is outside of the rotate-zoom transition thresholds, a third type of image transition sequence may be generated and used in at least some embodiments. In particular, for such fade transitions, the ILTM system may generate a transition sequence that begins with the start image and in which the end image is progressively blended into the start image until only the end image remains. Additional details related to the use of such fade transition techniques are included below.

In addition, in at least some embodiments, an Interior Capture and Analysis ("ICA") system may perform automated operations involved in generating multiple panorama images at multiple nearby viewing locations (e.g., with multiple rooms or other locations within a building or other structure), whether separately from the ILTM system or in association with an embodiment of the ILTM system (e.g., with both systems operated by a single entity, with some or all functionality of both systems integrated together into a larger system, etc.). The automated operations of such an ICA system may include acquiring and analyzing information from an interior of a house, building or other structure, for use in generating and providing a representation of that interior. For example, in at least some such embodiments, such techniques may include using one or more mobile devices (e.g., a smart phone held by a user, a camera held by or mounted on a user or the user's clothing, etc.) to capture video data from a sequence of multiple viewing locations (e.g., video captured at each viewing location while a mobile device is rotated for some or all of a full 360 degree rotation at that viewing location) within multiple rooms of a house (or other building), and to further capture data linking the multiple viewing locations, but without having detailed information about relative distance between the viewing locations and other depth information to objects in an environment around the viewing locations. After the viewing location videos and linking information are captured, the techniques may include analyzing video captured at each viewing location to create a panorama image from that viewing location that has visual data in multiple directions (e.g., a 360 degree panorama around a vertical axis), analyzing information to determine relative positions/directions between each of two or more viewing locations, creating inter-panorama positional/directional links in the panoramas to each of one or more other panoramas based on such determined positions/directions, and then providing information to display or otherwise present multiple linked panorama images for the various viewing locations within the house. Additional details related to one embodiment of such an ICA system are included in co-pending U.S. Non-Provisional patent application Ser. No. 15/649,434, filed Jul. 13, 2017 and entitled "Connecting And Using Building Interior Data Acquired From Mobile Devices," which is incorporated herein by reference in its entirety, and which includes disclosure of an example BICA system that is generally directed to obtain and use panorama images from within one or more buildings or other structures.

For illustrative purposes, some embodiments are described below in which specific types of information are acquired, used and/or presented in specific types of ways for specific types of structures and by using specific types of devices—however, it will be understood that such described techniques may be used in other manners in other embodiments, and that the invention is thus not limited to the exemplary details provided. As one non-exclusive example, some embodiments discuss obtaining start and end images from liked panorama images that capture interior portions of a building or other structure, but other embodiments may use other types of panorama images or other start and end images that are not part of panorama images. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts. In addition, the term "building" refers to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls and department stores), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. As used herein, the term "panorama image" refers to any visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of viewing locations, as used herein, refers generally to two or more viewing locations that are each visited at least once in a corresponding order, whether or not other non-viewing locations are visited between them, and whether or not the visits to the viewing locations occur during a single continuous period of time or at multiple different time periods.

Figure 1B:
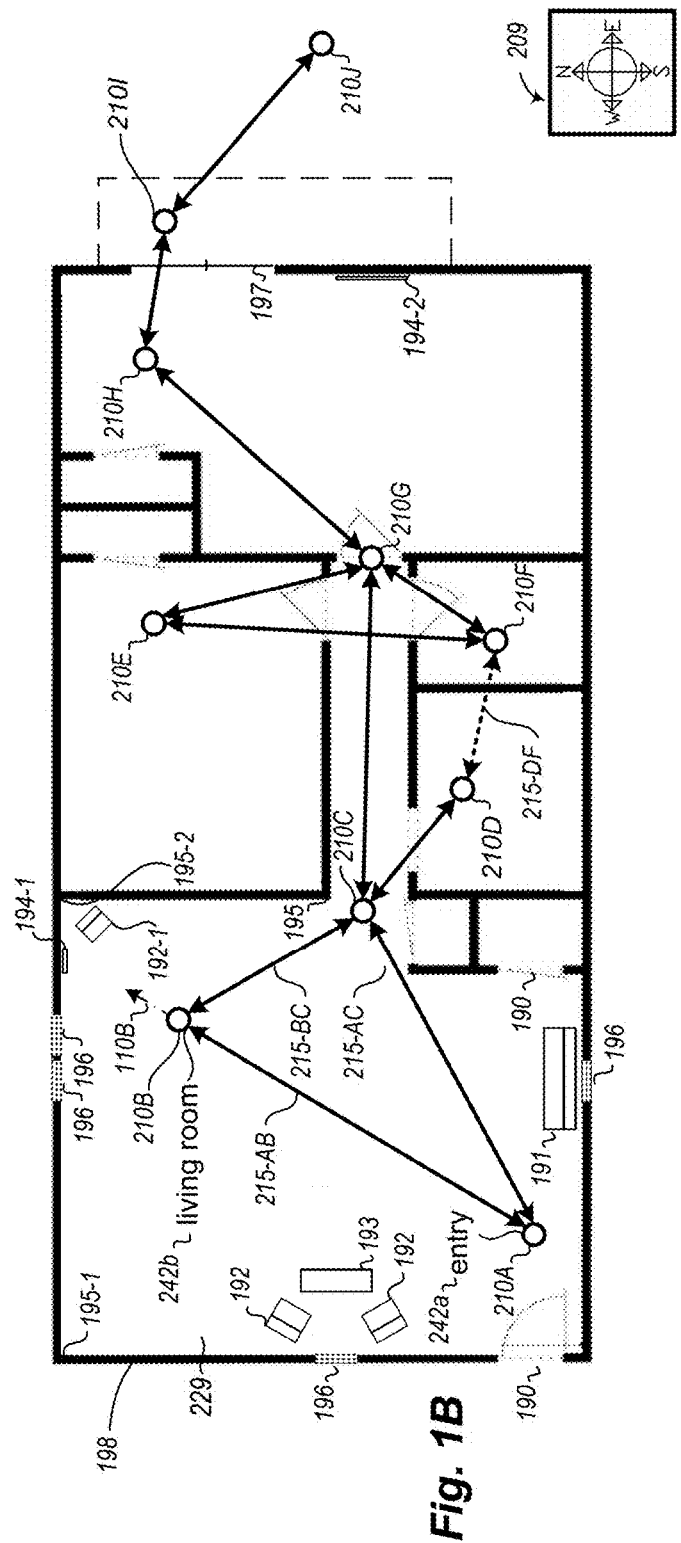

FIG. 1A is an example block diagram of interactions that various computing devices and systems may perform in accordance with the described techniques. In particular, one or more linked panorama images 265 have been generated by an ICA system 260 executing on one or more server computing systems 180 in this example, such as with respect to one or more buildings or other structures—FIG. 1B shows one example of such linked panorama images for a building, as discussed further below. An ILTM system 270 is further executing on one or more server computing systems to generate and provide image transition sequences 275 between some or all of the linked panorama images 265—in some embodiments, the ICA system 260 and ILTM system 270 may execute on the same server computing system(s), such as if both systems are operated by a single entity or are otherwise executed in coordination with each other, while in other embodiments the ILTM system may instead obtain linked panorama images (or other images for which image transition sequences are generated and provided) from one or more external sources and optionally store them locally (not shown) with the ILTM system for further analysis and use.

One or more users (not shown) of one or more client computing devices 175 may further interact over one or more computer networks 170 with the ILTM system 270 and optionally the ICA system 260, such as to obtain and interact with a linked panorama image (e.g., to change the horizontal and/or vertical viewing direction from which a corresponding image is displayed from the panorama image, such as to determine a portion of the panorama image in a 3D spherical coordinate system to which a current user viewing direction is directed, and to render a corresponding planar image that illustrates that portion of the panorama image without the curvature or other distortions present in the original panorama image). If the user selects to transition from the current image being displayed from a first panorama image to a different second panorama image (or other final destination image), the ILTM system further generates a corresponding image transition sequence (or retrieves a pre-computed sequence for some or all of the transition, if it exists), and provides the image transition sequence over the computer network(s) 170 to the client computing device 175 of the user for display on that client computing device. In some embodiments, a user initiates such a transition to another panorama image (or other destination image) by interacting with a current image being displayed (e.g., to select a user-selectable link or other control provided in or with the current image), as discussed in greater detail below, including with respect to FIGS. 2A-2H.

In the depicted computing environment 180 of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

FIG. 1B depicts a block diagram of an exemplary building interior environment in which linked panorama images may be gathered and subsequently used for presentation to users, including for the ILTM system to use to generate and provide image transition sequences between the linked panorama images. In particular, FIG. 1B includes a building 198 with an interior that may be captured via multiple panorama images, such as by a user carrying a mobile device (not shown) with image acquisition capabilities as it is moved through the building interior to a sequence of multiple viewing locations 210 by the user. An embodiment of the ICA system (e.g., ICA system 260 on server computing system(s) 180, a copy of some or all of the ICA system executing on the user's mobile device, etc.) may automatically perform or assist in the capturing of the data representing the building interior, as well as further analyze the captured data to generate a visual representation of the building interior. While the mobile device of the user may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments include or otherwise have access to equipment to measure the depth of objects in the building relative to a location of the mobile device, such that relationships between different panorama images and their viewing locations may be determined in part or in whole based on matching features in different images and/or using information from other of the listed hardware components.

In operation, a user associated with the mobile device arrives at a first viewing location 210A within a first room of the building interior, and captures a view of the building interior from that viewing location 210A (e.g., some or all of the first room, and optionally small portions of one or more other adjacent or nearby rooms, such as through doors, halls or other connections from the first room) as the mobile device is rotated around a vertical axis at the first viewing location (e.g., with the user turning his or her body in a circle while holding the mobile device stationary relative to the user's body). The view capture may be performed by recording a video and/or taking a succession of images, and may include a number of objects or other features (e.g., structural details) that may be visible in images (e.g., video frames) captured from the viewing location, such as doorways 190 and 197 (e.g., with swinging and/or sliding doors), windows 196, corners or edges 195 (including corner 195-1 in the northwest corner of the building 198, and corner 195-2 in the northeast corner of the first room that includes viewing locations 210A, 210B and 210C), furniture 191-193 (e.g., a couch 191, chairs 192, a table 193, etc.), pictures or paintings or other wall objects 194, etc. The user may also optionally provide a textual or auditory identifier to be associated with a viewing location, such as "entry" 242a for viewing location 210A or "living room" 242b for viewing location 210B, while in other embodiments the ICA system may automatically generate such identifiers (e.g., by automatically analyzing video and/or other recorded information for a building for the determination, such as by using machine learning) or the identifiers may not be used.

After the first viewing location 210A has been adequately captured (e.g., by a full rotation of the mobile device), the user may proceed to a next viewing location (such as viewing location 210B), optionally recording video and/or other data from the hardware components (e.g., from one or more IMUs) during movement between the viewing locations. At the next viewing location, the user may similarly use the mobile device to capture a view from that viewing location. This process may repeat from some or all rooms of the building and optionally external to the building, as illustrated for viewing locations 210C-210J. The acquired video and/or other images for each viewing location are further analyzed to generate a panorama image for each of viewing locations 210A-210J, including in some embodiments to match objects and other features in different images. In addition to generating such panorama images, further analysis may be performed in order to 'link' at least some of the panoramas together with lines 215 between them, such as to determine relative positional information between pairs of viewing locations that are visible to each other and store corresponding inter-panorama links (e.g., links 215-AB, 215-BC and 215-AC between viewing locations A and B, B and C, and A and C, respectively), and in some embodiments and situations to further link at least some viewing locations that are not visible to each other (e.g., link 215-DF between viewing locations D and F).

FIGS. 2A-2H illustrate examples of generating and providing image transition sequences between start and end images, such as with respect to some of the example panorama images generated for viewing locations 210 illustrated in FIG. 1B. In particular, FIG. 2A illustrates an example image 250a that may correspond to a portion of the panorama image 210B of FIG. 1B, such as if a view direction from the location of that panorama image is currently being viewed in direction 110B of FIG. 1B. In this example, the portion of the panorama image illustrated in image 250a includes portions of two windows 196, a picture or painting 194-1, a chair 192-1, and walls, floor, and ceiling with borders between them, including a vertical border 195-2 between two walls. While not part of the displayed image, additional information 205a is shown in this example to illustrate the center point of the image 250a, such as for use in subsequent generation of a corresponding image transition sequence.

FIG. 2B continues the example of FIG. 2A, and in particular illustrates a separate but related example image 250b. In this example, the image 250b may be part of the separate panorama image 210A of FIG. 1B that is linked to panorama image 210B, and in particular may correspond to an example in which the outgoing view direction from the panorama image 210A is pointed directly at the location of the panorama image 210B along the inter-panorama link 215-AB in both the horizontal and vertical directions. Accordingly, the center 205b of the image 250b is the same as the center 205a of the image 250a as illustrated in FIG. 2A, and the previous image 250a from the panorama image 210B is a subset of the image 250b from the panorama image 210A, with the image 250a subset shown with dashed lines for the purpose of illustration, although such dashed lines may also not be displayed as part of the image 250b shown to a user. Since image 250b includes the previous image 250a, image 250b continues to include the same objects in the surrounding environment, such as the windows 196, the picture or painting 194-1, chair 192-1, and inter-wall and floor and ceiling borders such as border 195-2. In addition, the wider angle of view from the more distant panorama image 210A location allows additional information to be shown in image 250b, such as a lighting fixture 230a, a table 230b, and optionally other objects in the environment. In addition, because the panorama images for viewing locations 210A and 210B are linked, the image 250b includes a generated virtual user-selectable control 240*b* to visually indicate that the user may select that control to move from the location at which image 250*b* was taken (the viewing location for panorama image 210A) to the linked panorama image at viewing location 210B (used to produce image 25*a*), with the additional text label 242*b* of "living room" from FIG. 1B added along with the user-selectable control 240*b*.

In this example, the user who is viewing the image 250*b* proceeds to select the control 240*b* of FIG. 2B, initiating the generation and presentation to the user of a image transition sequence as the images change from start image 250*b* to an end image of the panorama image at viewing location 210B, with the end result of the transition sequence being end image 250*a* as shown in FIG. 2A (since the viewing direction 1108 from the panorama image at viewing location 210B) continues in the same direction as the straight line link direction from viewing location 210A to viewing location 210B. FIG. 2C further illustrates transition sequence markers 225*c* to visually represent the image transition sequence that will be provided to simulate moving from start image 250*b* and toward end image 250*a*, although such transition markers 225*c* may not be illustrated to the user.

It will be appreciated that a large number of images may be generated and displayed as part of such an image transition sequence—for example, if 30 frames per second are being displayed (in a manner similar to a video) and the transition length of time is 1 second, approximately 30 images may be generated and displayed to the user. In this example of FIG. 2D, one such intermediate example image 250*d* is shown, with FIG. 2D illustrating a subset of the image 250*b* that will be shown as part of the new image 250*d* in that intermediate state. As illustrated by transition markers 225*d*, the resulting image 250*d* may be reached from the start image 250*b* by zooming in during an initial part of the image transition sequence during a first period of time. As discussed in greater detail elsewhere herein, the first period of time for the image transition sequence may include zooming, from the start image, part of the way to the end image, before a subsequent second period that begins with a zoomed out version of the end image and zooming into the final resulting end image. FIG. 2E then illustrates the intermediate image 250*d* that is the result of the zooming in from the start image 250*b*, and as discussed may correspond to a calculated zoom-in scale sc as discussed in greater detail elsewhere herein. It will be appreciated that the example intermediate image 250*d* may be the end result of a number of images generated during the first part of the image transition sequence for the first period of time—for example, if the first part of the image transition sequence involves a period of time of 0.5 seconds, and 30 frames per second are shown during the entire image transition sequence, there may be 14 prior images generated and viewed before the 15th image that is the image 250*d* in this example.

FIG. 2E further illustrates information with transition sequence markers 225*e* that correspond to the second part of the image transition sequence during a second period of time. As previously noted, the beginning of the second part of the transition sequence may include a zoomed out version of the end image 250*a*, as graphically illustrated in FIG. 2E by the reverse direction of the markers 225*e* to correspond to creating that zoomed-out version of end image 250*a* (to be the same as or similar to the zoomed-in image 250*d* from the end of the first period of time), and with subsequent images during the second period corresponding to zooming in to reach the final resulting end image 250*a* as the end of the second period of time for the image transition sequence. The example type of transition sequence discussed with respect to FIGS. 2A-2E is referred to at times herein as a center-zoom transition, since the zooming occurs around the center of the images. Furthermore, since the center of the start image 250*b* is the same as the center 205*a* of the end image 250*a*, no initial rotation was used in this example to change from a slightly offset initial center location of the start image to reach the center 205*b* before zooming begins, but such initial rotation may be used in other center-zoom image transition sequences in which the initial center location of the start image is not perfectly aligned with the center of the end image (and the straight line direction between the viewing locations of the start and end images).

FIGS. 2F-2H further illustrate an alternative image transition sequence in which a center-zoom transition is not used, with a rotate-zoom transition instead being used. In particular, in the example of FIG. 2F, an example image 250*f* is shown from the same starting panorama at viewing location 210A as was used for the image 250*b* of FIG. 2B, but in this example the user has changed the center 205*f* of the image 250*f* to differ 235*f* in both the horizontal and vertical directions from the prior center 205*b* of example image 205*b* (and from the center of the end image 250*a* for the rotate-zoom transition to be used), resulting in additional objects being displayed in the room (e.g., an additional light fixture 230*c* and table 193). Accordingly, if the user again selects the user-selectable control 240*b* in image 250*f* of FIG. 2F, to cause a transition to the panorama image for viewing location 210B, merely performing zooming without rotation would not result in the end image 250*a* as is desired. Instead, as illustrated by the transition markers 225*f*, and further shown by the image center difference 235*f*, rotation to the right and up is needed as well as zooming in to reach the desired end image 205*a*. While in some embodiments the rotation phase could be performed before any zoom-in occurs, in the illustrated embodiment the rotation and zooming are performed at least partially simultaneously, such as to begin with 30%-50% of the rotation and to then begin to start zooming, although in other embodiments the rotation and zooming could both begin immediately at the beginning of the image transition sequence.

FIG. 2G continues the example of FIG. 2F, and includes information to illustrate an example intermediate image 250*h* that will be generated as part of the image transition sequence from start image 250*f* to end image 250*a*. In particular, and in a manner analogous to that shown in FIG. 2D, the intermediate image 250*h* corresponds to an initial first part of the image transition sequence that includes rotation and zooming during the first period of time, as illustrated with the transition marks 225*g* of FIG. 2G, and corresponds to reducing the amount of vertical and horizontal difference between the center of the start image 205*f* to the center 205*a* of the end image 250*a* by a partial amount 235*g*. FIG. 2H then illustrates the example image 250*h* as it is shown as part of the image transition sequence. The image 250*h* may thus correspond to the end of the first time period during which zooming-in and rotation is performed on the start image 250*f*, with a second period of time of the transition sequence then including starting with a zoomed-out and partially rotated version of the end image 250*a*, and continuing to zoom in and rotate to reach the end image 250*a*, such as in a manner similar to that illustrated with respect to FIGS. 2A-2B. Accordingly, FIG. 2H includes example further transition marks 225*h* that show the additional zooming in and rotating to reach the final end image 250*a*, so as to perform a further adjustment from the center location 205*h* to reach the final center image location 205*a* of image 250*a*. Thus, in this example the rotation includes and is performed during both the first and second periods involving the zoom-in from the start image and the further zooming in from the zoomed-out version of the end image.

Thus, for the center-zoom transition discussed with respect to FIGS. 2B-2E, the transition turns to the departure angle direction, and zooms to and blends in the end image in a precise scale. The zoomed blending process may use a pre-computed zoom-in scale value, and the start image overlays with the end image regardless of parallax, such as to simulate, for a user at the viewing location of the starting panorama image, turning to the inter-panorama linking straight line direction and walking forward to the viewing location for the end image.

Conversely, for the rotate-zoom transition discussed with respect to FIGS. 2F-2H, the transition starts zooming in at a non-screen-center location while turning to this zoom-in center, indicating the direction of the next panorama with respect to the current viewing angle. The zoom-in and image blending actions may start in the middle of the camera rotation process, so that when the start image blends into the end image, the transition is still rotating and zooming in, with this transition working without further adjustment if there are no perspective difference between horizontal scale and vertical scales. To have the start and end images overlap with each other throughout the blending, the start and end images are rotated and zoomed at two sets of dependent speeds, with the rotation speeds being in a linear relation of slope value approximately equals to zoom-in scale sc. The zoom-in scales of the two images may be in an inverse relation, with the start image zoom-in at a scale increasing from 1.0 to sc, and the end image zoom-in at a scale increasing from 1/sc to 1.0. More generally, the determination may use horizontal departure angle, horizontal arrival angle (or an assumption that it is 0), transition time length, and a zoom-in scale sc, with some or all of the values optionally pre-computed (e.g., when generating inter-panorama links or other inter-image links between the starting and ending panoramas or between the start image and end image).

As one example embodiment for calculating the zoom-in scale value and other related information for use in such image transition sequences, the determination may use horizontal departure angle, horizontal arrival angle (or an assumption that it is 0), transition time length, vertical departure angle, vertical arrival angle (or an assumption that it is 0), and a zoom-in scale sc, with some or all of the values optionally pre-computed (e.g., when generating inter-panorama links or other inter-image links between the starting and ending panoramas or between the start image and end image). Pre-computation (or display-time computation) of such values may include first rendering the start image and end image from panorama images using a spherical coordinate system (also referred to herein as a "texture image") and view directions for those panorama images—such rendered start and end images are undistorted images that are usually modeled by pinhole camera models, while panorama texture images may be images of an entire 360 degree sphere and represented in spherical space, causing the panorama images to be geometrically distorted if cropped and directly viewed without correcting for distortion from the spherical space. Rendered images are usually a small portion of the panorama texture image with an image projection into a planar space.

The rendered start and end images are then sent through an image alignment process to align these two images by changing the start image camera pose and zoom-in scale. The alignment process may include discovering a collection of image feature points from each rendered images (e.g.; using an AKAZE feature detector), with the points selected by their strong gradient responses in spatial-color space. Strong point matches are then selected between these two feature point sets, where a selected point pair shows high correlations between their feature vectors, which describes the uniqueness in color and texture of their surrounding regions. When two images can be projected from one to the other, the positions (coordinates) of the actual matching point pairs are linearly correlated between each other, where the conversion is constrained by the geometrical assumption of such image projection. The project is assumed to represent camera pitch and yaw rotation and camera zoom-in settings (field-of-view angle changes), with the mathematical representation of this image projection able to be solved using a random sample consensus algorithm (RANSAC), such as an iterative 2-point RANSAC algorithm that considers both spherical space and pixel space to find the best image-to-image projection. Since the matching points from the solution of the image projection may be mixed with a large number of false matches, it is desirable to pick out the correct matches and use them to compute the projection details. In order to solve new start camera pose and zoom-in scale, there are 3 unknown parameters, so 2 matching point pairs and randomly picked in RANSAC iterations from the collection of matching candidates. The updated camera pose is then computed for the current samples in spherical space, and the selected matching points are re-projected from the start image with the new camera pose. Camera zoom-in scale can be computed in pixel space with the re-projected points of the start image and their corresponding points in the end image. With the new camera pose and zoom-in scale, all of the matching points are projected from the start image into the end image. Those point pairs with a re-projection distance less than our pre-defined distance threshold are counted as matching inliers. At the last step, the inliers with the largest number are used to re-compute the final camera pose and zoom-in scale, following the process mentioned above. To balance the false positive rate and false negative rate, the number of inliers are used to measure the risk of each alignment and choose the appropriate threshold of inlier number at the end of each alignment.

To render start and end images from panorama images, shader programs and quaternion may be used in texture sampling. For a precision zoom-center transition, two panorama rendered images are integrated into a single shader, with the two panoramas stacking with each other. The starting panorama (top layer) zooms in precisely at given departure angles ($\varphi\_dep$, $\theta\_dep$) with scale sc. The ending panorama (bottom layer) is rendered with no zoom in scale at ($\varphi\_arr$, 0). In the top layer, the camera stays at pitch and yaw angle 0, and the camera pose angle is handled in the shader program—in this case, the mathematics could be expressed as color(s, t)=color(sc*(f(s, t)+($\varphi$, $\theta$))). f(s, t) maps image coordinates (s, t) to the angles with respect to the optical axis (image center). ($\varphi$, $\theta$) is the camera pose of the image center (pinhole camera axis). Notice that sc is the scale in pixel coordinate space uv, and ($\varphi$, $\theta$) is yaw and pitch. The point of the math above is, at yaw angle 0, pitch_angle_pixel=pitch_angle_optical_axis+pitch_angle_between_pixel_opticl_axis, so the camera pitch and yaw angles in the equations above become offsets.

The zoom-center transition parameters can be computed by panorama alignment, with a goal to compute the adjusted departure angles ($\varphi\_dep$, $\theta\_dep$), panorama view zoom-in scale sc and camera rotation speed ratio $\gamma$. ($\varphi\_dep$, $\theta\_dep$) and $\gamma$ are computed in angle space, while zoom-in scale sc is computed in pixel space, and all these parameters are computed using the same group of image inliers from a dominant plan in panorama images. To be specific, with pixel coordinates of image inliers from the departure and arrival panoramas, coordinates are projected back into the angle space as pitch and yaw angles ($\varphi$, $\theta$). ($\varphi\_dep$, $\theta\_dep$) and $\gamma$ could be seen as the translation and scale for image stitching in angle space. With the computed ($\varphi\_dep$, $\theta\_dep$), angle translation is applied and the matching points from the starting panorama are re-projected into the ending panorama. After the projection, the zoom-in scale is computed in pixel space. Image inliers are computed by a 2-point based RANSAC, since there are only 3 unknown parameters to be solved (translation in both direction and scale). Starting from two panorama texture images, the start image and end image are rendered with the initial departure and relative angles, are and used to provide a pool of image feature matches. Two pairs of image feature point matches are iteratively picked and the alignment parameters are computed as discussed above. With these adjustment parameters and a re-projection distance threshold, all image feature point matches are re-projected from the starting panorama space to the ending panorama space, and the number of final inliers is found, with alignment eventually assessed by the number of inliers.

One panorama rendering method achieves rendering by wrapping textures around a sphere which is usually composed of dozens of triangle faces, with the uv sampling coordinates defined by interpolating the uv of control points (triangle vertices)—however, this can be inaccurate and computationally inefficient due to discrepancy of interpolation and redundancy of control points. A panorama could be interpreted as a texture map for every orientation within a certain field of view, so as to directly map viewing angles to texture colors, and to simplify the geometry to a cube with 8 vertices rather than tessellating a sphere. A vertex shader may then be used to do vertex projection and constant computation, and a fragment shader may then be used to convert xyz coordinates (from viewing coordinate system—include the simple geometry with texture material wrapped around) into azimuth angle $\varphi$ and zenith angle $\theta$ as texture coordinates (2D texture sampling coordinate system—texture as an image). Transition effects may include using ($f(\varphi)$, $f(\theta)$) to add scale and translation onto the original ($\varphi$, $\theta$).

To zoom a panorama at a given scale without distortion, the field of view angle may be changed from a graphics render pipeline (e.g., from a shader within the graphics render pipeline), where (x, y, z) is scaled in the viewing coordinate system. Using the graphics render pipeline works efficiently if only one panorama is being rendered, but for transition sequences, the rendering field of view angles are changed separately for the starting and ending panoramas. When using the graphics render pipeline, a second projection matrix may be computed in the vertex shader and used to control the scale of the second panorama, since some rendering environments (e.g., WebGL and openGL) only include a single projection matrix in its global variables. When using the fragment shader, an equation in the shader is changed to integrate the zoom-in scale parameter into the texture sampling step, to scale (x, y) in the viewing coordinate system and have sampling coordinates ($\varphi$, $\theta$) changing accordingly. However, if the viewing direction is not pointing to azimuthal angle $\varphi \neq 0$, the equation becomes quite complicated, and (u, v) are expressed as $f(x, y, sc, \varphi)$, which involves one or more unlinear functions composed of sin and cos. To simplify the computation, the geometry may be rotated so azimuthal angle $\varphi=0$ and the transition is performed at $\varphi=0$, so $u=f(x*sc, y*sc)+\varphi$. Thus, new texture coordinates are computed by $(u', v')=(u, v)+f(x, y)$, where (u, v) is the original texture coordinates, (x, y) is the screen coordinates of each pixel—this provides an advantage over $(u', v')=f(u, v)$ in removing black lines due to roundoff errors in some rendering environments (e.g., openGL), where f(x, y), the translation term, is independent of (u, v). In particular, viewing angle ($\varphi$, $\theta$) is computed by Azimuth angle $\varphi=a$ tan $2(x, z)/TWO\_PI+0.5$; Zenith Angle $\theta=a$ tan $2(y, r)/TWO\_PI+0.5$. However, due to the roundoff error, function a tan(x, z) is unstable when azimuth angle $\varphi$ is close to 90° (e.g., by simply applying the equation above, a black line at azimuth 90 degree ° is observed). A solution to this issue is for pixels in the black line region (around azimuth 90°), sample them from texture coordinate (0.0, v) instead of (u, v). Since the line is always 1 pixel wide, a determination is made of how close is each pixel to 90° azimuth in terms of angle, and the angle threshold is used to perform the texture sampling as above in order to produce a stable threshold.

For a zoom-in transition effect without rotation, the transition is composed of pixel movement and crossfade, with the coordinate incremental $f(u, v)=(1, 1)*t*k$. Pixels moves opposite to the screen center at a constant speed, giving users the experience of moving forward, which can be particularly effective when the zoom is fast and a small motion.

For a rotate-zoom transition effect, the transition is similar to the zoom-in, but $f(u, v)=(1, 1)*t*t*k$. Pixels move in an accelerating motion, with the starting panorama performing a zoom-in and fadeout, while the ending panorama zooms out and fades in, and with the zoom center being a function of departure angle, to cause zooming to the direction of the turn and create the experience of moving sideways. An issue with this transition is that the texture coordinates (u, v) for each pixel project a cropped texture image as a rendered undistorted view on screen, but (u, v) and (x, y) are not linearly correlated to each other, and adding a term f(x, y) will introduce distortion, especially when the magnitude of zoom is big, such that straight lines got bended as they're zoomed in and may not perfectly align with end image.

For a center-zoom transition effect, the starting panorama is rotated both horizontally and vertically to place the straight line direction to the ending panorama in the center, and to then zoom in with a pre-computed scale sc, while zooming out the ending panorama with 1/sc. During the transition, the starting panorama starts from current viewing angle ($\varphi$, $\theta$) with a field of view angle $\phi$, ends at arrival angles ($\varphi'$, 0) with a default field of view angle $\phi 0$. The shader uses formulas discussed above, and is used when the azimuthal angle $\varphi=0$.

A walk-in transition effect can thus be effectively used in some situations (e.g., when the starting and ending panorama images share visual elements), including for the center-zoom transition effect that involves turning to the departure direction and moving forward. The starting panorama image is rotated and zoomed in a manner similar to that discussed above, involving aligning rendered start and end images by changing the start image camera pose and zoom-in scale, while fading into the end image from the ending panorama image. This involves two panorama images zooming together at separate speeds, as discussed above with respect to the zoom-in and image blending actions. In this way, the visual representation of the start and end images may seamlessly overlay with each other during the fading, creating a realistic experience of entering a scene forward. As discussed above, if the alignment of the start and end images is not within the defined center-zoom transition thresholds, a rotate-zoom transition with a fixed zoom-in scale or other type of transition may instead be used.

Various details are provided with respect to FIGS. 2A-2I and with the example embodiment discussed above for calculating the zoom-in scale value and other related information for use in image transition sequences (optionally as part of a pre-computation that occurs before later use of the information in one or more image transition sequences), but it will be appreciated that the presented details are non-exclusive examples provided for illustrative purposes, and other embodiments may be performed in other manners.

Figure 3:
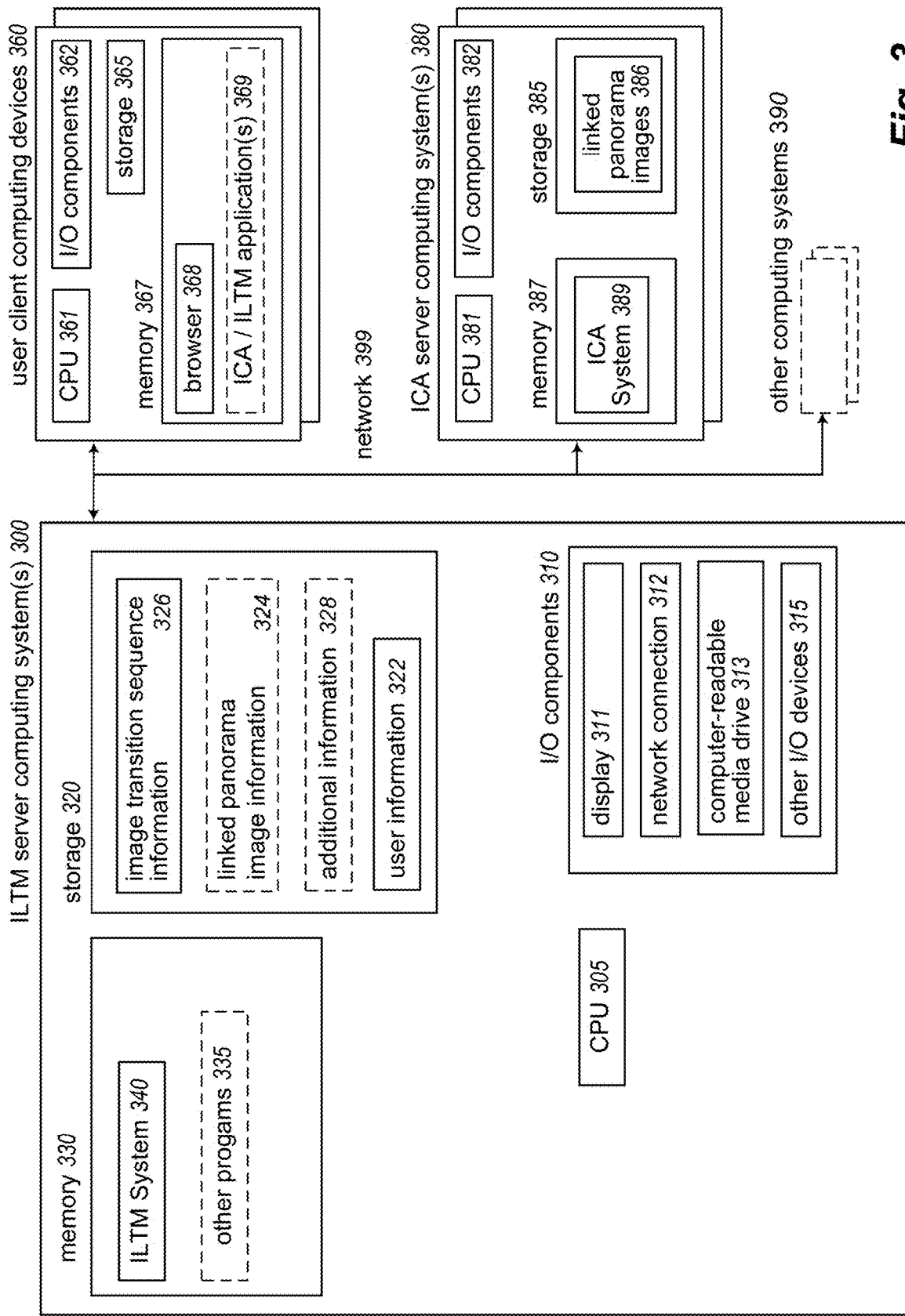
FIG. 3 is a block diagram illustrating a computing system suitable for executing an embodiment of a system that performs at least some of the techniques described in the present disclosure.

FIG. 3 is a block diagram illustrating an embodiment of one or more server computing systems 300 executing an implementation of a ILTM system 340—the server computing system(s) and ILTM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ILTM system 340 may communicate with other computing systems via one or more networks 399 (e.g., the Internet, one or more cellular telephone networks, etc.), such as user client computing devices 360 (e.g., used to view linked panorama images and associated image transition sequences), ICA server computing system(s) 380 (e.g., on which an ICA system executes to generate and provide linked panorama images), and optionally other computing systems 390 (e.g., used to capture building interior data; used to store and provide information to client computing devices, such as linked panorama images instead of server computing systems 380 or 300 or instead additional supplemental information associated with those panoramas and their encompassing buildings or other surrounding environment; etc.).

In the illustrated embodiment, an embodiment of the ILTM system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the ILTM system may include one or more components, not shown, to each perform portions of the functionality of the ILTM system, and the memory may further optionally execute one or more other programs 335—as one specific example, a copy of the ICA system may execute as one of the other programs 335 in at least some embodiments, such as instead of or in addition to the ICA system 389 on the ICA server computing system(s) 380. The ILTM system 340 may further store and/or retrieve various types of data during its operation on storage 320 (e.g., in one or more databases or other data structures), such as various types of user information 322, optionally linked panorama image information 324 (e.g., for analysis to generate image transition sequences; to provide to users of client computing devices 360 for display; etc.), generated image transition sequence information 326 (e.g., generated and saved image transition sequences, pre-computed information for use in such generation, etc.) and/or various types of optional additional information 328 (e.g., various analytical information related to presentation or other use of one or more building interiors or other environments captured by an ICA system).

Some or all of the user client computing devices 360 (e.g., mobile devices), client computing systems 380, and other computing systems 390 may similarly include some or all of the types of components illustrated for server computing system 300. As one non-limiting example, the server computing systems 380 are each shown to include one or more hardware CPU(s) 381, I/O components 382, storage 385, and memory 387, with an embodiment of the ICA system 389 executing within memory 387, and linked panorama images 386 that are generated by the ICA system being stored on storage 385. As another non-limiting example, the user client computing devices 360 are each shown to include one or more hardware CPU(s) 361, I/O components 362, storage 365, and memory 367, with one or both of a browser 368 and one or more client applications 369 (e.g., an application specific to the ILTM system and/or ICA system) executing within memory 367, such as to participate in communication with the ILTM system 340, ICA system 389 and/or other computing systems.

It will be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ILTM system 340 may in some embodiments be distributed in various components, some of the illustrated functionality of the ILTM system 340 may not be provided, and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ILTM system 340 and/or ILTM client software 369 executing on server computing systems 300 and/or client computing devices 360) and/or data structures, such as by execution of software instructions of the one or more software programs and/or by storage of such software instructions and/or data structures. Furthermore, in some embodiments, some or all of the systems and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
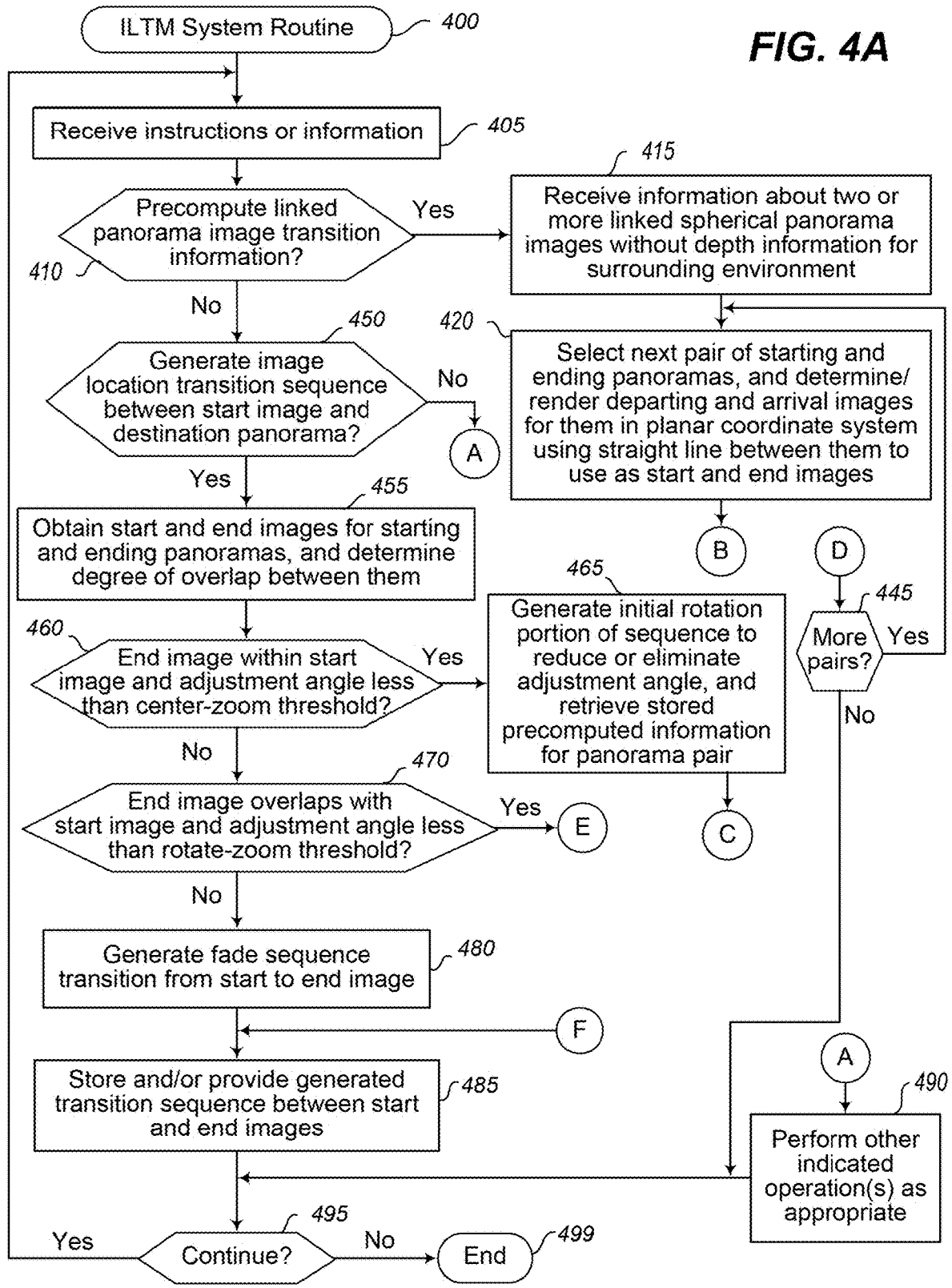

FIGS. 4A-4B illustrate an example flow diagram of an embodiment of a Image Locations Transition Manager (ILTM) routine 400. The routine may be performed by, for example, execution of the ILTM System 270 of FIG. 1A, the ILTM System 340 of FIG. 3, and/or the ILTM system as discussed with respect to FIGS. 2A-2I or as elsewhere described herein, such as to generate and provide a transition sequence of images between start and end images at different locations within a building or other geographical area. While the illustrated embodiment acquires and uses information based at least in part on linked panorama images that use a spherical coordinate system, it will be appreciated that other embodiments may generate image transition sequences between other types of images (e.g., still images at different locations within a building or other geographical area) in a similar manner. In addition, while the illustrated embodiment of the routine operates without having detailed information about relative distance between the viewing locations and other depth information to objects in an environment around the viewing locations, in other embodiments additional depth or location information may be available and optionally used. Furthermore, while the illustrated embodiment discusses the ILTM system doing pre-computation of various information between linked panorama images in particular manners, it will be appreciated that in other embodiments such pre-computation may be performed in other manners or may not be performed at all (e.g., if the corresponding computations are performed at a time of generating particular image transition sequences). For example, such pre-computation may be performed in some embodiments by the ILTM system executing on one or more server computing systems (e.g., server computing systems 180 of FIG. 1A, server computing systems 300 of FIG. 3, etc.), while in other embodiments some or all such pre-computation may instead be performed by a separate ICA system as part of generating linked panorama image information (e.g., ICA system 260 of FIG. 1A, ICA system 389 of FIG. 3, etc.), and/or may be performed on a client device on which an image transition sequence is displayed (e.g., client devices 175 of FIG. 1A or client devices 360 of FIG. 3, such as by executing at least some of the functionality of the ILTM system and/or the ICA system on the client device).

The illustrated embodiment of the routine begins at block 405 where instructions or information are received. The routine continues to block 410 to determine whether instructions are received in block 405 to pre-compute linked panorama image transition information, and if so proceeds to perform a loop including blocks 415-445 to perform such pre-computations—in other embodiments, some or all such pre-computation may instead be performed by an embodiment of an ICA system (e.g., as part of generating and linking two or more panorama images), with the resulting pre-computed information made available to the ILTM system for use. In block 415, the routine receives information about two or more linked spherical panorama images without depth information for the surrounding environment. After block 415, the routine continues to block 420 to select a next pair of starting and ending panoramas from which to determine linking information for use in later generating image transition sequences, and to determine departing and arrival images for the starting and ending panoramas in a planar coordinate system using a straight line link between the panorama locations, such as for potential later use as start and/or end images. It will be appreciated that two linked panoramas may, in at least some embodiments and situations, form two different pairs of starting and ending panoramas, with each of the panoramas serving as a different role in each of the two pairs, and with departing and arrival images that differ in 180° from those for the opposite pair.

After block 420, the routine continues to block 425, where it determines and uses horizontal arrival angle and adjusted horizontal/vertical departure angle and departure zoom-in scale for the start and end images to compute alignment parameters for matching points in the images, and to determine a zoom-in scale sc to use for zoom-in from the start image during the first subset of the image transition sequence, along with an inverse zoom-out scale of 1/sc from which to zoom in to the end image during a second subset of the image transition sequence. Additional details related to determining the matching points and otherwise calculating and determining corresponding angles and values is discussed in greater detail elsewhere herein. After block 425, the routine continues to block 430 to determine whether to generate the image transition sequence between the start and end images, such as if the image transition sequences are part of the pre-computed information and are stored for later use. If so, the routine continues to block 440 to use the alignment parameters for the matching points and the determined zoom-in and zoom-out scale information to generate a center-zoom transition sequence over a specified transition time length from the start image to the end image, using a first period of the zoom-in from the start image to zoom-in using the zoom-in scale, and a second period for the zoom-in to the end image from the zoom-out scale, and stores and/or provides the generated image transition sequence information for later use. If it was instead determined in block 430 that the image transition sequence is not generated, the routine continues instead to block 435, where it stores the computed alignment parameters for the matching points and the determined zoom-in and zoom-out scales for the pair of starting and ending panoramas. After blocks 435 or 440, the routine continues to block 445 to determine if there are more pairs of starting and ending panoramas to analyze, and if so returns to block 420 to select a next such pair of starting and ending panoramas.

If it is instead determined in block 410 that the information or instructions received in block 405 are not to pre-compute linked panorama image transition information, the routine continues instead to block 450 to determine whether the information or instructions received in block 405 indicate to currently generate and provide image transition sequence information between a start image and a destination panorama, such as in response to a user selection, from a start image of a first panorama image, to move to a destination indicated panorama image. If so, the routine continues to block 455 to obtain the start and end images for the starting and ending panoramas, and to determine a degree of overlap between the start and end images, such as based at least in part on determining matching features between the images as discussed in greater detail elsewhere herein. The routine then continues to block 460 to determine whether the end image is fully contained within the start image and an adjustment angle for the start image to a direct line link to the destination image is less than a threshold designated for center-zoom transition sequences. If so, the routine continues to block 465, where it generates an initial portion of the image transition sequence that involves rotating from the start image within the starting panorama to reduce or eliminate the adjustment angle, such as to end with an adjusted start image pointed directly at the destination panorama. The routine further retrieves stored information for the pair of starting and ending panoramas (e.g., as previously calculated and stored with respect to blocks 425-440) in the example embodiment, and continues to block 440 to use the pre-computed information for the starting and ending panoramas to generate the remaining portion of the image transition sequence being generated, as well as to store and/or provide the resulting generated image transition sequence, such as for display to the user. The routine then proceeds to block 445 and on to block 495. In other embodiments, no such pre-computed information may be used, and the routine may instead generate the information in blocks 425 and 440 at run-time when the image transition sequence is generated and presented.

If it is instead determined in block 460 that the end image is not fully within the start image or the adjustment angle is not less than the center-zoom threshold, the routine continues instead to block 470 to determine whether the start image overlaps with the end image and the adjustment angle is less than a larger rotate-zoom threshold. If so, the routine continues to block 475, where it determines and uses horizontal departure and arrival angles, and further determines zoom-in rates and rotation rates for use in first and second subsets of the image transition sequence. The determined zoom-in rates include first and second zoom-in rates to use for zoom-in from the start image during the first subset of the image transition sequence and for zoom-in from a zoomed-out version of the end image to reach the end image during a second subset of the image transition sequence, and the determined rotation rates include first and second rotation rates to use for rotation from the start image during the first subset of the image transition sequence toward the straight line direction linking the viewing locations of the start image and destination panorama, and for further rotation from a zoomed-out version of the end image to reach the end image during a second subset of the image transition sequence. The rotation rates may be in a linear relation of slope value approximately equals to zoom-in scale sc. The routine then further uses the determined information to generate a rotate-zoom transition sequence over a specified transition time length from the start image to the end image, using a first period of rotation and zoom-in from the start image using the first zoom-in rate and first rotation rate and beginning the zoom at a non-center location while rotating toward the center, and a second period of rotation and zoom-in to the end image from the zoomed-out and partially rotated end image, while blending the end image information from the second period with the start image information from the end of the first period. The routine then continues to block 485 to store and/or provide the generated image transition sequence information for presentation.

If it instead determined in block 470 that the end image does not overlap with the start image at all or that the adjustment angle is greater than the rotate-zoom threshold, the routine continues instead to block 480, where it generates a fade transition sequence from the start image to the end image. After blocks 475 or 480, the routine continues to block 485 to store and/or provide the generated image transition sequence between the start and end images.

If it is instead determined in block 450 that the instructions or information received in block 405 are not to currently generate an image transition sequence, the routine continues instead to block 490 to perform one or more other indicated operations as appropriate. Such other operations may include, for example, receiving and storing information about linked panoramas (e.g., from an associated ICA System), generating information about such linked panoramas (e.g., if the ILTM system includes some or all of the functionality of the ICA system), performing other interactions with users or other computing systems, etc.

After blocks 485 or 490, or if it instead determined in block 445 that there are not more pairs of starting and ending panoramas to analyze, the routine continues to block 495 to determine whether to continue, such as until an explicit indication to terminate is received. If it is determined to continue, the routine returns to block 405, and otherwise continues to block 499 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

displaying, by a computing device and to a user, a first panorama image previously taken from a first location in a building, including modifying, in response to one or more user interactions, a current direction of view for the first panorama image to cause display of an area of the building that includes a second location from which a second panorama image was previously taken;

receiving, by the computing device and from an additional interaction of the user with the displayed first panorama image, a selection to change to the second panorama image;

generating, by the computing device, a visual transition sequence that simulates movement from the first location to the second location, including:

determining, by the computing device, and relative to a direct view to the second location in a straight line from the first location, an amount of an angle between the current direction of view for the first panorama image and the direct view, and that the determined amount of the angle exceeds a defined threshold for use of zooming without rotation in the visual transition sequence;

selecting, by the computing device, the current direction of view for the first panorama image as a beginning of the visual transition sequence;

selecting, by the computing device, and as an end of the visual transition sequence, a portion of the second panorama image that is in a direction of view away from the first location and corresponding to the direct view;

defining, by the computing device, and based at least in part on the determined amount of the angle exceeding the defined threshold, a first period of time for rotating and zooming that includes progressively rotating, from the beginning of the visual transition sequence at the current direction of view in the first panorama image, to the direct view to the second location and that simultaneously includes progressively increasing an amount of zoom in the first panorama image, resulting in a zoomed portion of the first panorama image centered on the direct view to the second location; and defining, by the computing device, a second period of time for blending that begins with the zoomed portion of the first panorama image centered on the direct view to the second location and that includes progressively blending the selected portion of the second panorama image by increasing a relative proportion of the portion of the second panorama image in the direction of view corresponding to the direct view, resulting in the selected portion of the second panorama image at an end of the second period of time; and displaying, by the computing device, and to the user over an amount of time that includes the first and second periods of time, the visual transition sequence to simulate the movement from the first location to the second location, and ending with a display of the selected portion of the second panorama image.

2. The computer-implemented method of claim 1 wherein the defining of the second period of time further includes performing further simultaneous rotating and zooming while progressively blending the selected portion of the second panorama image, wherein a first rate of zoom for the zooming during the first period of time is different from a second rate of zoom for the zooming during the second period of time, and wherein a first rate of rotation for the rotating during the first period of time is different from a second rate of rotation for the rotating during the second period of time.

3. The computer-implemented method of claim 2 wherein the generating of the visual transition sequence further includes selecting, by the computing device and based at least in part on the determined amount of the angle exceeding the defined threshold, to use a rotate-zoom type of transition that includes the rotating and zooming for the first period of time and the further rotating and zooming during the second period of time, and wherein the method further comprises, after the displaying of the visual transition sequence:

modifying, by the computing device and in response to one or more further user interactions, a direction of view for the second panorama image to cause display of an additional area of the building that includes a third location from which a third panorama image was previously taken; and generating, by the computing device, a second visual transition sequence that simulates movement from the second location to the third location, including:

determining, by the computing device, and relative to a second direct view to the third location in a straight line from the second location, an amount of a second angle between the modified direction of view for the second panorama image and the second direct view, and that the determined amount of the second angle does not exceed the defined threshold for use of zooming without rotation in the second visual transition sequence;

selecting, by the computing device and based at least in part on the determined amount of the second angle not exceeding the defined threshold, a center-zoom type of transition to use for the second visual transition sequence that is different from the rotate-zoom type of transition used for the visual transition sequence;

selecting, by the computing device, the modified direction of view for the second panorama image as a beginning of the second visual transition sequence, and a portion of the third panorama image that is in a direction of view away from the second location as an end of the second visual transition sequence;

defining, by the computing device, and based at least in part on the selected center-zoom type of transition, a third period of time for zooming without rotating that includes progressively increasing an amount of zoom in the second panorama image, resulting in an intermediate image that includes a zoomed portion of second first panorama image centered on the second direct view to the third location; and defining, by the computing device and based at least in part on the selected center-zoom type of transition, a fourth period of time for blending that begins with the intermediate image and that includes progressively blending the selected portion of the third panorama image over the fourth period of time while performing further zooming from a zoomed-out version of the selected portion of the third panorama image, resulting in the selected portion of the third panorama image at an end of the fourth period of time; and displaying, by the computing device, and to the user over an amount of time that includes the third and fourth periods of time, an animation of the second visual transition sequence to simulate the movement from the second location to the third location, and ending with a display of the selected portion of the third panorama image.

4. A computer-implemented method comprising:

presenting, by a computing system and to a user, a first image taken from a first location in a first viewing direction away from the first location;

determining, by the computing system, to present a second image taken from a second location, wherein all of the second image is not visible in the presented first image in the first viewing direction away from the first location; and presenting, by the computing system, and to the user over a period of time, a visual transition sequence that simulates movement from the first location to the second location, wherein the presenting of the visual transition sequence includes performing simultaneous rotating and zooming during a first subset of the period of time that begins with the first image and progressively increases an amount of zoom within the first image to result in an intermediate image that includes an enlarged portion of part of the first image, and includes performing blending during a second subset of the period of time that begins with the intermediate image and blends the second image with the intermediate image by progressively increasing a relative proportion of the second image that is shown until only the second image is shown, ending with a display of the second image.

5. The computer-implemented method of claim 4 wherein the presenting of the first image by the computing system includes transmitting, by the computing system and over one or more computer networks, the first image to a client computing device of the user for display on the client computing device, and wherein the determining to present the second image is based at least in part by an interaction of the user with the first image displayed on the client computing device.

6. The computer-implemented method of claim 5 wherein the first image displayed on the client computing device includes a user-selectable control displayed on the first image at a position corresponding to the second location, and wherein the interaction of the user with the first image displayed on the client computing device includes selecting the user-selectable control displayed on the first image.

7. The computer-implemented method of claim 5 wherein the first image is a first subset of a starting panorama image that is taken from the first location, and wherein the presenting of the first image by the computing system includes, before displaying of the first image on the client computing device:

displaying, on the client computing device, a third image from a second subset of the starting panorama image corresponding to a view direction that does not include a view of the second location;

receiving one or more initial interactions of the user with the displayed third image, including to change the view direction within the starting panorama image to the first viewing direction; and selecting, in response to the one or more initial interactions and based on the changed view direction, a first subset of the starting panorama image to use as the first image, and initiating the displaying of the first image on the client computing device.

8. The computer-implemented method of claim 7 wherein the second image is a subset of an ending panorama image that is taken from the second location, and wherein the presenting of the visual transition sequence includes determining a view direction within the ending panorama image away from the first location, and selecting the subset of the ending panorama image to use as the second image based on the determined view direction.

9. The computer-implemented method of claim 4 wherein the presenting of the visual transition sequence includes selecting first parameters to use for the zooming during the first subset of the period of time that include at least one of a first rate of zoom for the zooming or a zoom-in scale to reach by an end of the first subset of the period of time, and includes selecting second parameters to use for additional zooming during the second subset of the period of time that begins with a zoomed-out image of the second image and ends with the second image, the second parameters including at least one of a second rate of zoom for the additional zooming or a zoom-out scale to use for the zoomed-out image at a start of the second subset of the period of time.

10. The computer-implemented method of claim 9 wherein the first image is part of a starting panorama image and the second image is part of an ending panorama image, wherein the method further comprises pre-computing and storing, before the presenting of the first image, the first and second parameters as part of analysis of the starting and ending panorama images to identify a link connecting the starting and ending panorama images, and wherein the selecting of the first and second parameters includes retrieving the stored pre-computed first and second parameters.

11. The computer-implemented method of claim 9 wherein the selecting of the first parameters includes selecting the zoom-in scale, wherein the selecting of the second parameters includes selecting the zoom-out scale to be a multiplicative inverse of the zoom-in scale, and wherein the presenting of the visual transition sequence further includes determining to use a received transition length as the period of time and includes computing the first and second rates of zoom based on the period of time, the zoom-in scale and the zoom-out scale.

12. A non-transitory computer-readable medium having stored contents that cause one or more computing systems to perform automated operations, the automated operations including at least:

presenting, by the one or more computing systems and to a user, a first panorama image in a first viewing direction from a first location, and a user-selectable visual indicator of a second location that is in a different second direction from the first location;

selecting, by the one or more computing systems in response to a selection by the user of the user-selectable visual indicator, and based at least in part on a determined amount of difference between the first viewing direction and the second direction, a transition sequence type, from multiple types of transition sequences, to use to simulate moving from the presented first panorama image in the first viewing direction to a second panorama image from the second location that is presented in an initial viewing direction away from the first location; and presenting, by the one or more computing systems, and to the user over a period of time, an image transition sequence of the selected transition sequence type, wherein the presenting of the image transition sequence includes performing rotating and zooming during a first subset of the period of time that begins with the first panorama image in the first viewing direction and progressively increases an amount of zoom to reach an intermediate image that includes an enlarged portion of part of the first panorama image, and includes performing blending during a second subset of the period of time that begins with the intermediate image and changes to the second panorama image in the initial viewing direction by progressively increasing a relative proportion of the second panorama image that is shown.

13. The non-transitory computer-readable medium of claim 12 wherein the stored contents include software instructions that, when executed, perform further automated operations to determine the amount of difference and that the amount of difference satisfies a center-zoom transition threshold in which a current subset of the first panorama image corresponding to the first viewing direction includes all of a second subset of the second panorama image corresponding to the initial viewing direction, wherein the selected transition sequence type is a center-zoom transition such that the zooming performed during the first subset of the period of time occurs at a center of a first subset of the first panorama image that results after the rotating from the current subset of the first panorama image, and wherein the performing of the blending during the second subset of the period of time further includes performing additional zooming from a zoomed-out version of a second subset of the second panorama image in the initial viewing direction to reach, after the additional zooming, the second panorama image in the initial viewing direction.

14. The non-transitory computer-readable medium of claim 13 wherein the determining of the amount of difference includes measuring an angular difference between a straight line direction from the first location to the second location and the first viewing direction for the displayed first panorama image.

15. The non-transitory computer-readable medium of claim 13 wherein the software instructions further cause the one or more computing systems to generate the image transition sequence by retrieving and using pre-computed parameters for a link from the first panorama image to the second panorama image, the pre-computed parameters including at least one of a first rate of zoom for the zooming or a zoom-in scale to reach by an end of the first subset of the period of time, and further including at least one of a second rate of zoom for the additional zooming or a zoom-out scale to use for the zoomed-out version of the second subset of the second panorama image.

16. The non-transitory computer-readable medium of claim 12 wherein the stored contents include software instructions that, when executed, perform further automated operations to determine the amount of difference and that the amount of difference satisfies a rotate-zoom transition threshold in which a current subset of the first panorama image corresponding to the first viewing direction includes some of a second subset of the second panorama image corresponding to the initial viewing direction, wherein the selected transition sequence type is a rotate-zoom transition such that the zooming occurs at a location away from a center of the current subset of the first panorama image and is performed simultaneously with rotating from the current subset of the first panorama image toward a first subset of the first panorama image that results after the rotating from the current subset of the first panorama image, and wherein the performing of the blending during the second subset of the period of time further includes performing additional zooming from a zoomed-out version of a second subset of the second panorama image in the initial viewing direction to reach, after the additional zooming, the second panorama image in the initial viewing direction.

17. The non-transitory computer-readable medium of claim 16 wherein the determining of the amount of difference includes measuring an angular difference between a straight line direction from the first location to the second location and the first viewing direction for the displayed first panorama image.

18. The non-transitory computer-readable medium of claim 12 wherein the stored contents include software instructions that, when executed, further cause the one or more computing systems to present a second image transition sequence to an end image from a start image that does not include any of the end image, wherein the second image transition sequence is of a fade type of image transition sequence, and wherein presenting of the second image transition sequence includes fading from the start image to the end image without performing zooming or rotation.

19. The non-transitory computer-readable medium of claim 18 wherein the stored contents further cause the one or more computing systems to determine to use the fade type of image transition sequence from the multiple types of transition sequences based at least in part on a measured angular difference exceeding a rotate-zoom transition threshold, and wherein the measured angular difference is between a straight line direction from a location of the start image to a location of the end image and a current view direction for the start image.

20. The non-transitory computer-readable medium of claim 12 wherein the one or more computing systems are part of an image locations transition manager system, wherein the presenting of the first panorama image by the one or more computing systems includes transmitting the first panorama image over one or more computer networks to a client computing device of the user for display on the client computing device, and wherein the instruction from the user to present the second panorama image is based at least in part by an interaction of the user with a user-selectable control displayed on the first panorama image at a position corresponding to the second location.

21. A system comprising:
one or more hardware processors of one or more computing systems; and
one or more memories with stored instructions that, when executed by at least one of the one or more hardware processors, cause the one or more computing systems to perform automated operations to implement at least some functionality of an image locations transition manager system, including at least:

presenting, to a user, a subset of a first panorama image in a current view direction from a first location, wherein the first panorama image is taken from the first location;

determining, in response to an indication to present a second panorama image taken from a second location, an amount of difference between the current view direction of the first panorama image and an inter-panorama view direction from the first location of the first panorama image to the second location of the second panorama image;

selecting, based at least in part on the determined amount of difference, and from multiple types of transition sequences, a transition sequence type to use to simulate moving from the current view direction of the first panorama image to an initial view direction of the second panorama image away from the first location; and presenting, to the user over a period of time, an image transition sequence of the selected transition sequence type, including performing rotating and zooming during a first subset of the period of time that begins with the current view direction of the first panorama image and progressively increases an amount of zoom to reach an intermediate image that includes an enlarged portion of part of the first panorama image, and including performing blending during a second subset of the period of time that begins with the intermediate image and changes to the initial view direction of the second panorama image by progressively increasing a relative proportion of the second panorama image that is shown.

22. The system of claim 21 wherein the software instructions further cause the one or more computing systems to perform automated operations to implement at least some functionality of an interior capture and analysis system, including to generate the first and second panorama images and to determine a link between the first and second panorama images in the inter-panorama view direction from the first panorama image to a subset of the first panorama image that includes a view of the second location.

23. The system of claim 21 further comprising a client computing device of the user, wherein the presenting of the subset of the first panorama image in the current view direction to the user includes receiving, by the client computing device, the first panorama image from the one or more computing systems and displaying an initial subset of the first panorama image in an initial view direction on the client computing device and changing, in response to interactions by the user, the displayed initial subset to a display of a different subset of the first panorama image in the current view direction, and wherein the presenting of the image transition sequence to the user includes receiving, by the client computing device, the image transition sequence from the one or more computing systems and displaying the image transition sequence on the client computing device over the period of time, including to display a plurality of images during the displaying of the image transition sequence.

* * * * *